(12) United States Patent
Komiya et al.

(10) Patent No.: US 9,071,351 B2
(45) Date of Patent: Jun. 30, 2015

(54) OPTICAL SWITCH

(71) Applicant: FUJITSU LIMITED, Kawasaki-shi, Kanagawa (JP)

(72) Inventors: Shinji Komiya, Sapporo (JP); Tsukasa Takahashi, Sapporo (JP)

(73) Assignee: FUJITSU LIMITED, Kawasaki (JP)

( * ) Notice: Subject to any disclaimer, the term of this patent is extended or adjusted under 35 U.S.C. 154(b) by 189 days.

(21) Appl. No.: 13/834,995

(22) Filed: Mar. 15, 2013

(65) Prior Publication Data

US 2013/0315583 A1    Nov. 28, 2013

(30) Foreign Application Priority Data

May 24, 2012   (JP) .................................. 2012-119051

(51) Int. Cl.
*H04J 14/00* (2006.01)
*H04B 10/075* (2013.01)
*H04J 14/02* (2006.01)
*H04Q 11/00* (2006.01)

(52) U.S. Cl.
CPC .......... *H04B 10/075* (2013.01); *H04J 14/0204* (2013.01); *H04J 14/0209* (2013.01); *H04J 14/0212* (2013.01); *H04Q 11/0005* (2013.01); *H04Q 2011/0009* (2013.01); *H04Q 2011/0015* (2013.01); *H04Q 2011/0016* (2013.01); *H04Q 2011/003* (2013.01); *H04Q 2011/0039* (2013.01)

(58) Field of Classification Search
CPC ............... H04Q 2011/0026; H04Q 2011/003; H04Q 2011/0039; H04Q 2011/0041
USPC .......................................... 398/45–46, 82, 88
See application file for complete search history.

(56) References Cited

U.S. PATENT DOCUMENTS

2005/0220394 A1* 10/2005 Yamamoto et al. ............. 385/18
2006/0215955 A1*  9/2006 Mitamura ....................... 385/18
2009/0323149 A1* 12/2009 Mizukami et al. .......... 359/221.2

FOREIGN PATENT DOCUMENTS

JP    2006-267522    10/2006

* cited by examiner

*Primary Examiner* — Dzung Tran
(74) *Attorney, Agent, or Firm* — Staas & Halsey LLP

(57) ABSTRACT

An optical switch include a switch unit including a light reflection unit of which the reflection direction is changeable, the switch unit configured to optically connect an input port to an output port via the light reflection unit by changing the reflection direction of the light reflection unit; a determining light input unit configured to input into a first predetermined port a determining light for determining malfunctions in the light reflection unit; a light detection unit configured to detect the determining light from the output from a second predetermined port; and a malfunction determining unit configured to determine that abnormalities have occurred when the determining light is detected by the light detection unit.

13 Claims, 34 Drawing Sheets

US 9,071,351 B2

OPTICAL SWITCH

CROSS-REFERENCE TO RELATED APPLICATION

This application is based upon and claims the benefit of priority of the prior Japanese Patent Application No. 2012-119051, filed on May 24, 2012, the entire contents of which are incorporated herein by reference.

FIELD

The embodiments discussed herein are related to an optical switch.

BACKGROUND

According to the related art, optical communication systems that use wavelength division multiplexing (WDM) are known (hereafter, WDM communication systems). With WDM communication systems, transmitting wavelength multiplexed signaling light in which signaling light of multiple wavelengths is multiplexed enables different information to be transmitted simultaneously. Further, the wavelength multiplexed signaling light is called WD signaling light.

Regarding WDM communication systems, optical switches, which are so-called wavelength selectable switches, are provisioned in the optical transmission devices on the network to transmit the multiple streams of information to the desired output destinations. For example, the wavelength selectable switch, which includes an light reflection unit in which the reflection direction is changeable, modifies the reflection direction of the light reflection unit, and optically connects an arbitrary input port which receives input of the WDM signaling light to an arbitrary output port via the light reflection unit. As a result, the wavelength selectable switch generates the WDM signaling light by multiplexing the received signaling light, and divides the signaling light of an arbitrary wavelength from the signaling light that has been multiplexed into WDM signaling light.

The wavelength selectable switch according to the related art will be described using FIGS. 40 and 41. FIG. 40 is a cross-sectional diagram of the wavelength selectable switch according to the related art, and FIG. 41 is a top view diagram of the wavelength selectable switch according to the related art. Further, regarding FIGS. 40 and 41, the solid lines represent the optical path of the signaling light, and the bidirectional arrows represent the direction of movement.

As illustrated in FIG. 40, the wavelength selectable switch includes, for example, multiple input ports that receive the input signaling light and multiple output ports that output the signaling light. The wavelength selectable switch also includes a first optical system which includes a lens and such to collimate the signaling light input from the input port and the signaling light output from the output port.

As illustrated in FIG. 41, when WDM signaling light, which is the signaling light multiplexed with an m type of wavelengths λ1 through λm, is input into the wavelength selectable switch, the wavelength selectable switch collimates the WDM signaling light input from the input port at the first optical system, and then illuminates a wavelength division unit. Then, a second optical system condenses signaling light divided for each wavelength, illuminates this to a micro electro mechanical system (MEMS) array with an m number of MEMS mirrors provisioned corresponding to each wavelength. The m number of micro electro mechanical system (MEMS) mirrors are an example of the light reflection unit that may change the reflection direction.

Here, the MEMS array rotationally drives the MEMS mirror along the X axis to change the reflection direction of the MEMS mirror, and optically connects the arbitrary input port that receives the input WDM signaling light and the arbitrary output port via the MEMS mirror. The reflection direction of the MEMS mirror may be changed, for example, by applying drive voltage to an electrode to rotationally drive the MEMS mirror, and then using the electrostatic force generated by the electrode.

Then, the wavelength selectable switch collimates the signaling light reflected by the MEMS mirror in which the reflection direction has been changed at the second optical system, and outputs this from an optional output port via wavelength division. Further, the wavelength selectable switch may be set to output at an optional damping rate for each wavelength by rotationally driving the MEMS mirror along the X axis or Y axis in very fine increments.

Although the wavelength selectable switch including multiple input and output ports has been described using FIGS. 40 and 41, other known switches include a DROP type wavelength selectable switch with one input port and multiple output ports, and an ADD type wavelength selectable switch with multiple input ports and only one output port.

An example of the related art is disclosed in Japanese Laid-open Patent Publication No. 2006-267522.

The wavelength selectable switch previously described unfortunately has not been given enough consideration to suitable determination of light reflection unit malfunctions.

Specifically, regarding the wavelength selectable switch according to the related art, when the MEMS mirror malfunctions due to some reason and is not rotationally driven, the signaling light reflected on the MEMS mirror will not be output from the output port, and the monitor value of the light output from the output port is zero. When the monitor value of the light output from the output port is zero, a malfunction may have occurred in the MEMS mirror, or a malfunction may have occurred in a monitor device which is provisioned downstream from the output node, or a malfunction may have occurred in a node upstream from the wavelength selectable switch. However, the wavelength selectable switch according to the related art does not differentiate between and determine whether a malfunction has occurred in the monitor device which is provisioned downstream from the output node, a malfunction has occurred in the node upstream from the wavelength selectable switch, or a malfunction has occurred in the MEMS mirror. For this reason, it is difficult for a MEMS mirror malfunction to be properly determined at the wavelength selectable switch according to the related art.

Thus, a method to determine that a malfunction has occurred in the MEMS mirror may be implemented by measuring the voltage applied to the electrode of the MEMS mirror and then comparing the measured voltage value with a target value. However, with this method, an electronic part for measuring the voltage applied to the electrode of the MEMS mirror is provisioned to each MEMS mirror, and this may cause the device to become increasingly larger as the number of MEMS mirrors increase. For this reason, the method to measure the voltage applied to the electrode of the MEMS mirror is not very realistic.

SUMMARY

According to an aspect of the invention, an optical switch include a switch unit including a light reflection unit of which the reflection direction is changeable, the switch unit configured to optically connect an input port to an output port via the light reflection unit by changing the reflection direction of the light reflection unit; a determining light input unit configured to input into a first predetermined port a determining light for determining malfunctions in the light reflection unit; a light detection unit configured to detect the determining light from the output from a second predetermined port; and a malfunction determining unit configured to determine that abnormalities have occurred when the determining light is detected by the light detection unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments of the optical switch disclosed in the present application will be described in detail with reference to the figures. Further, the following embodiments will be described using examples in which the optical switch disclosed in the present application apply to a wavelength selectable switch, but the disclosed technology in these embodiments is not limited in this way.

First Embodiment

Figure 1:
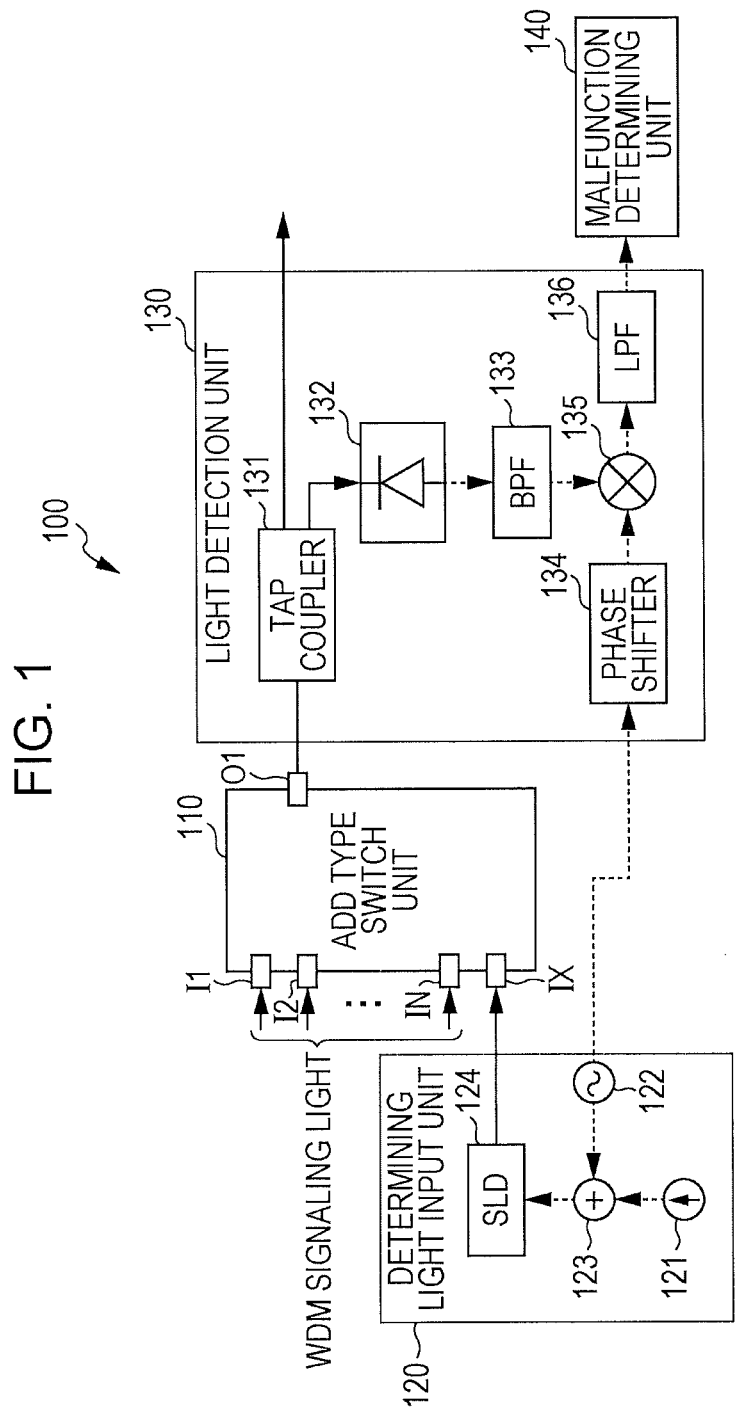
FIG. 1 is a diagram for describing a configuration of a wavelength selectable switch related to a first Embodiment.

First, the configuration of the wavelength selectable switch related to the present embodiment will be described. FIG. 1 is a diagram for describing a configuration of a wavelength selectable switch related to a first Embodiment. In FIG. 1, an ADD type WSS, which is a wavelength selectable switch that has multiple input ports and one output port is used for the example. As illustrated in FIG. 1, a wavelength selectable switch 100 related to the first Embodiment includes an ADD type switch unit 110, a determining light input unit 120, a light detection unit 130, and a malfunction determining unit 140.

The ADD type switch unit 110 includes MEMS mirrors in which the reflection direction is changeable, and by changing the reflection direction of the MEMS mirrors, multiple input ports I1 through IN receiving the input of WDM signaling light are optically connected to an output port O1 via the MEMS mirrors. Also, when the ADD type switch unit 110 does not change the reflection direction of the MEMS mirror, an unused input port (hereafter, called the unused port) Ix is optically connected to the output port O1 via the MEMS mirror.

Figure 2:
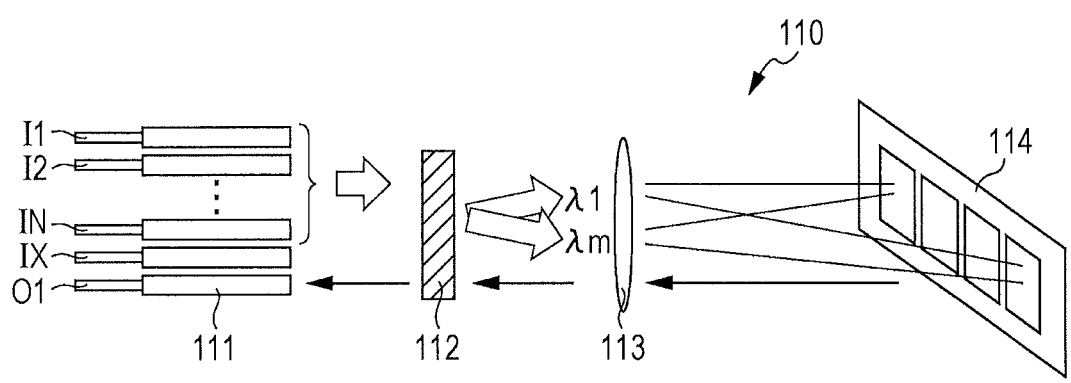
FIG. 2 is a diagram for describing a configuration of an ADD type switch unit related to the first Embodiment.

The configuration of the ADD type switch unit 110 will now be described. FIG. 2 is a diagram for describing a configuration of an ADD type switch unit related to the first Embodiment. As illustrated in FIG. 2, the ADD type switch unit 110 includes the multiple input ports I1 through IN, the single unused port IX, the single output port O1, a first optical system 111, a wavelength division unit 112, a second optical system 113, and a MEMS array 114. Also, when the WDM signaling light including wavelengths of m types (λ1 through λm) is input into the ADD type switch unit 110, the ADD type switch unit 110 collimates the WDM signaling light input from the input ports I1 through IN at the first optical system 111, and illuminates this to the wavelength division unit 112. The ADD type switch unit 110 divides the WDM signaling light per wavelength via the wavelength division unit 112. The ADD type switch unit 110 condenses the signaling light divided per wavelength at the second optical system 113, and the condensed signaling light is illuminated onto the MEMS array 114 which contains an m number of MEMS mirrors provisioned corresponding to each wavelength. The m number of MEMS mirrors is an example of light reflection units.

The ADD type switch unit 110 changes the reflection direction of the MEMS mirrors in the MEMS array 114 so that the signaling light of m types of wavelengths are multiplexed and output from the output port O1, and also so that the input ports I1 through IN are optically connected to the output port O1 via the MEMS mirrors.

Figure 3:
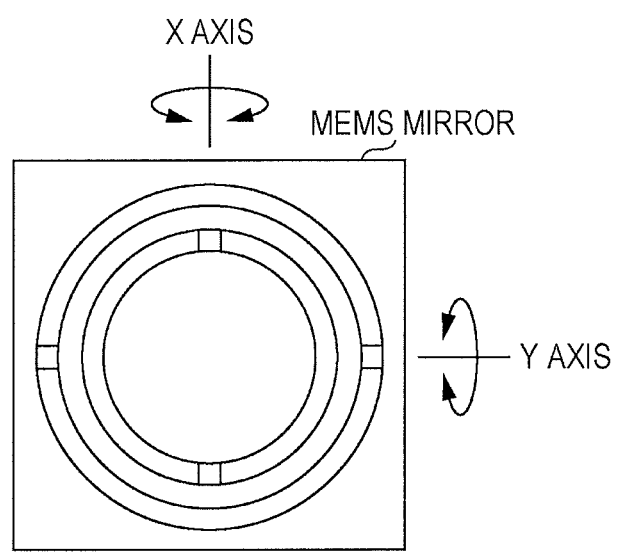
FIG. 3 is a diagram for describing a processing to change the reflection direction of a MEMS mirror by the ADD type switch unit related to the first Embodiment.

FIG. 3 is a diagram for describing a processing to change the reflection direction of a MEMS mirror by the ADD type switch unit related to the first Embodiment. As illustrated in FIG. 3, the ADD type switch unit 110 rotationally drives the MEMS mirror along the X axis and along the Y axis to change the reflection direction of the MEMS mirror. As a result, the input ports I1 through IN are optically connected to the output port O1 via the MEMS mirrors.

Figure 4:
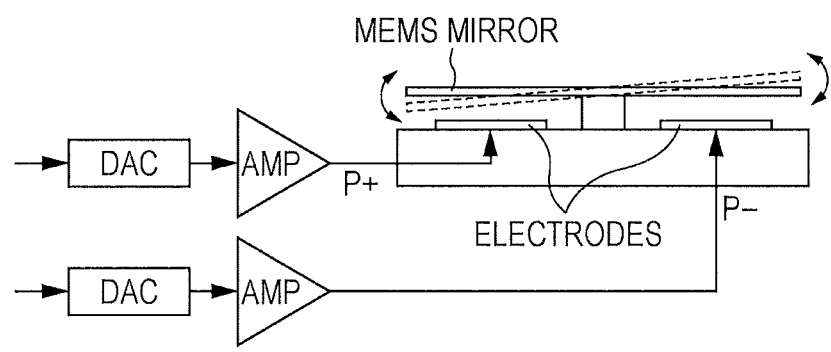
FIG. 4 is a diagram illustrating a configuration example for rotationally driving the MEMS mirror by the ADD type switch unit related to the first Embodiment.

FIG. 4 is a diagram illustrating a configuration example for rotationally driving the MEMS mirror by the ADD type switch unit related to the first Embodiment. As illustrated in FIG. 4, the ADD type switch unit 110 outputs a drive voltage for rotationally driving the MEMS mirrors from a digital analog converter (DAC), amplifies this at an amplifier (AMP), and applies the amplified drive voltage to an electrode used to drive the MEMS mirror. According to the example in FIG. 4, the ADD type switch unit 110 applies positive and negative drive voltage to each electrode in a pair of electrodes placed opposite one another so as to sandwich a supporting unit of the MEMS mirror. Thus, electrostatic force is generated by the pair of electrodes. The MEMS mirror is pulled to the side of the electrode by the electrostatic force generated by the electrode. As a result, the MEMS mirror is rotated by only a predetermined angle along the X axis and along the Y axis.

Figure 5:
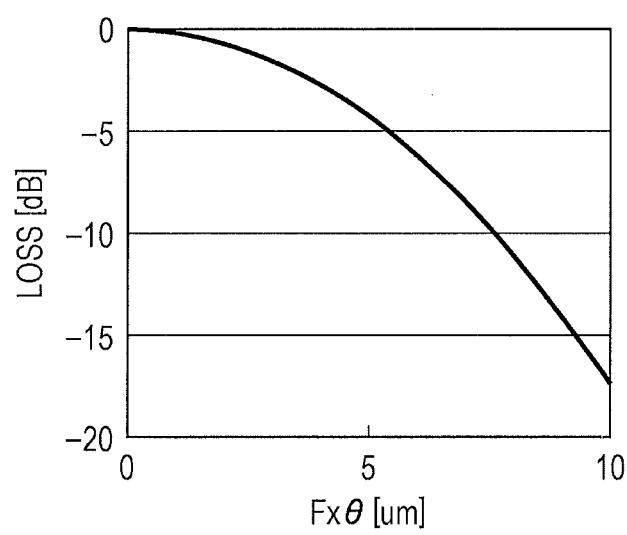
FIG. 5 is a diagram for describing a relationship between the rotational angle of the MEMS mirror and a damping rate of a signaling light.

Further, the ADD type switch unit 110 may also control the rotation angle of the MEMS mirror so as to output the signaling light of an m type of wavelengths from the output port O1 at a predetermined damping rate. FIG. 5 is a diagram for describing a relationship between the rotational angle of the MEMS mirror and a damping rate of a signaling light. The vertical axis in FIG. 5 represents a loss (dB) which is the damping rate of the signaling light, and the horizontal axis represents the multiplied vale (urn) of a focus distance of the second optical system 113 (F) and the rotational angle of the MEMS mirror (θ). As illustrated in FIG. 5, as the multiplied value of the focus distance of the second optical system 113 (F) and the rotational angle of the MEMS mirror (θ) increases, the signaling light attenuates. In other words, when the focus distance of the second optical system 113 (F) is a constant value, the signaling light still attenuates as the rotational angle of the MEMS mirror (θ) increases.

Figure 6:
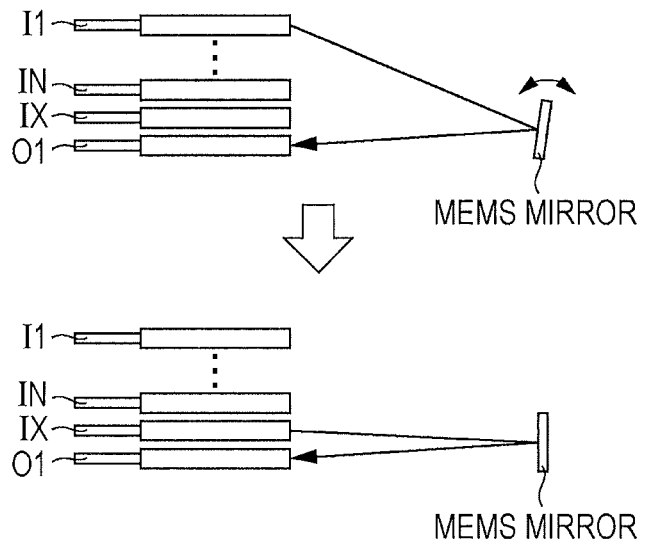
FIG. 6 is a diagram for describing the optical connection between an unused port and an output port via the MEMS mirror.

Also, when the ADD type switch unit 110 does not change the reflection direction of the MEMS mirror in the MEMS array 114, the unused port IX is optically connected to the output port O1 via the MEMS mirror. FIG. 6 is a diagram for describing the optical connection between an unused port and an output port via the MEMS mirror. When changing the reflection direction of the MEMS mirror, that is to say, when rotationally driving the MEMS mirror, as illustrated in FIG. 6, the ADD type switch unit 110 optically connects the input ports I1 through IN to the output port O1 via the MEMS mirrors. In contrast, when not changing the reflection direction of the MEMS mirrors, that is to say, when rotational driving of the MEMS mirror is stopped, as illustrated in FIG. 6, the ADD type switch unit 110 optically connects the unused port IX to the output port O1 via the MEMS mirror. In other words, the reflection direction of the MEMS mirror is set to an initial value so that the unused port IX is optically connected to the output port O1 via the MEMS mirror when the drive voltage for rotationally driving the MEMS mirrors is not applied to the electrodes for driving the MEMS mirrors. This means that when a malfunction occurs in the MEMS mirror or parts of the electrodes and such related to the MEMS mirror for some reason, and as a result, the reflection direction of the MEMS mirror is not changed, the unused port IX is optically connected to the output port O1 via the MEMS mirror.

A modification example of the ADD type switch unit 110 will now be described using FIG. 7 through 11. For example, the ADD type switch unit 110 according to the present embodiment controls the rotational angle of the MEMS mirror so that the signaling light is output at the predetermined damping rate, the signaling light may be output at the predetermined damping rate by controlling the refractive index of a liquid crystal element. That is to say, the ADD type switch unit 110 includes liquid crystal elements provisioned corresponding to each MEMS mirror in the MEMS array 114. Also, the ADD type switch unit 110 controls the refractive index of the liquid crystal elements so that the signaling light per wavelength is adjusted to the predetermined damping rate.

Figure 7:
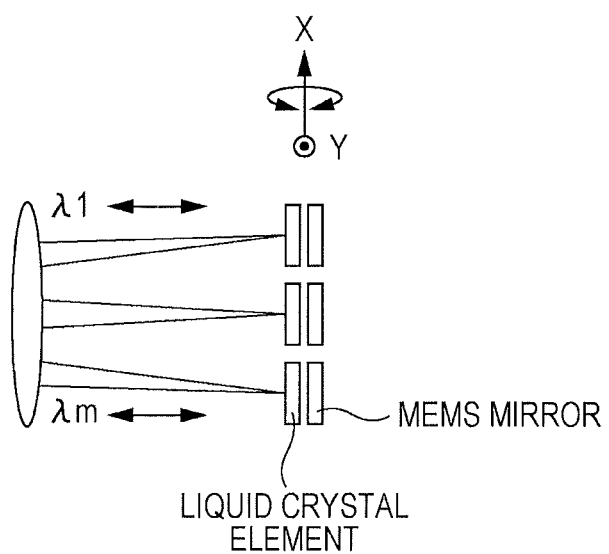
FIG. 7 is a diagram for describing a modification (a first) of the ADD type switch unit related to the present embodiment.

FIG. 7 is a diagram for describing a modification (a first) of the ADD type switch unit related to the present embodiment. As illustrated in FIG. 7, the ADD type switch unit 110 includes liquid display elements provisioned corresponding to each MEMS mirror in the MEMS array 114. The ADD type switch unit 110 changes the reflection direction of the MEMS mirrors by rotationally driving the MEMS mirrors along the X axis. As a result, the input ports I1 through IN are optically connected to the output port O1 via the MEMS mirrors. In contrast, the ADD type switch unit 110 controls the damping rate of the signaling light per wavelength by applying a voltage for adjusting the damping rate to the liquid crystal elements.

Figure 8:
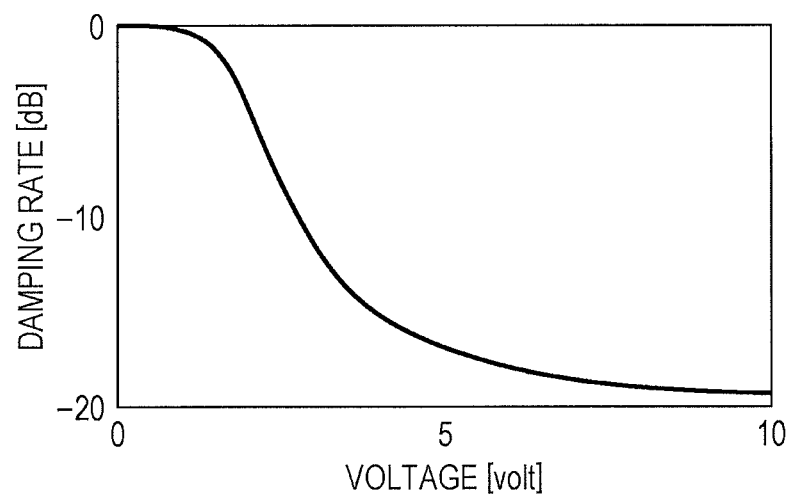
FIG. 8 is a diagram for describing a relationship between an applied voltage of a liquid crystal element and the damping rate of the signaling light.

FIG. 8 is a diagram for describing a relationship between an applied voltage of a liquid crystal element and the damping rate of the signaling light. The vertical axis in FIG. 8 represents the damping rate of the signaling light (dB), and the horizontal axis represents the applied voltage to the liquid crystal elements (V). As illustrated in FIG. 8, as the applied voltage to the liquid crystal elements increases, the signaling light attenuates.

Also, according to the present embodiment, the ADD type switch unit 110 changes the reflection direction of the MEMS mirrors in the MEMS array 114 to optically connect the input and output ports, for example, but the input and output ports may also be optically connected by changing the reflection direction of multiple reflection type liquid crystal elements. That is to say, the ADD type switch unit 110 includes a reflection type liquid crystal array, in place of the MEMS array 114, containing multiple reflection type liquid crystal elements provisioned corresponding to each wavelength of the signaling light. Also, the ADD type switch unit 110 changes the reflection direction of the reflection type liquid crystal elements in the reflection type liquid crystal array, and optically connects the input ports and the output port via the reflection type liquid crystal elements to multiplex the signaling light of different wavelengths and output this from the output port.

Figure 9:
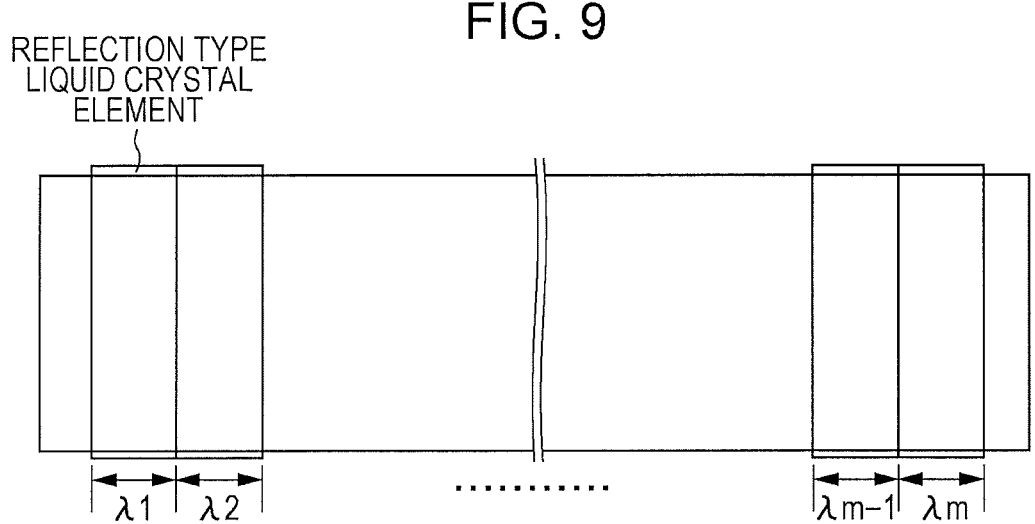
FIG. 9 is a diagram for describing a modification (a second) of the ADD type switch unit related to the present embodiment.

FIG. 9 is a diagram for describing a modification (a second) of the ADD type switch unit related to the present embodiment. As illustrated in FIG. 9, the ADD type switch unit 110 illuminates the signaling light divided per wavelength from the WDM signaling light that includes an m type of wavelengths (λ1 through λm) onto the reflection type liquid crystal array containing an m number of reflection type liquid crystal elements provisioned corresponding to each wavelength. The m number of reflection type liquid crystal elements reflects the multiple signaling light multiplexed into WDM signaling light, corresponding to each wavelength of the signaling light. The reflection type liquid crystal elements are an example of the light reflection unit. Further, the reflection type liquid crystal array containing the m number of reflection type liquid crystal elements is called LCOS (Liquid Crystal on Silicon, registered trademark).

The ADD type switch unit 110 changes the reflection direction of the reflection type liquid crystal elements in the reflection type liquid crystal array, and optically connects the input ports I1 through IN to the output port O1 via the reflection type liquid crystal elements to multiplex the signaling light of an m type of wavelengths and output this from the output port.

Figure 10:
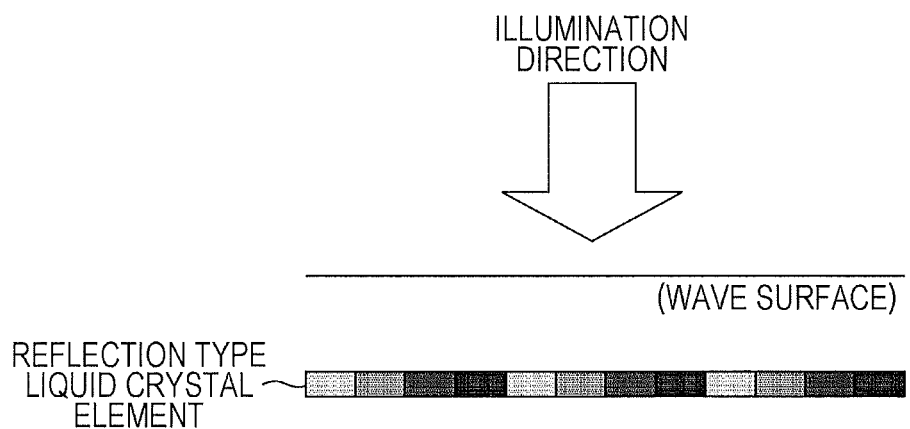
FIG. 10 is a diagram for describing a modified processing of the reflection direction of a reflection type liquid crystal element.
Figure 11:
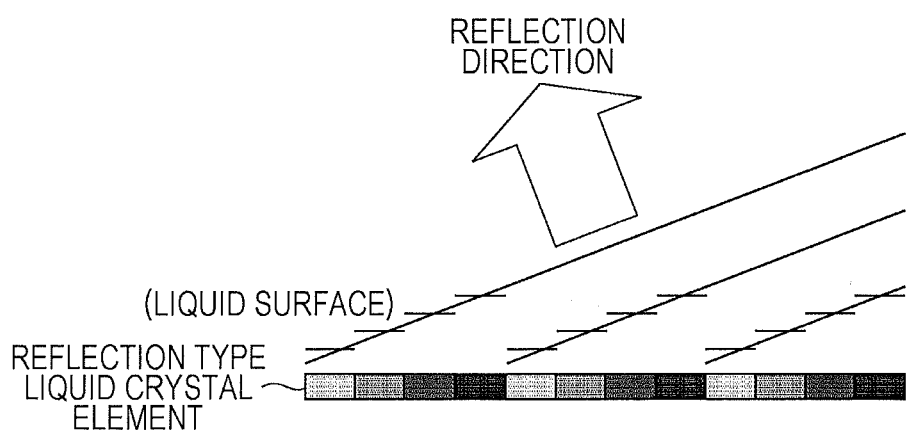
FIG. 11 is a diagram for describing a modified processing of the reflection direction of the reflection type liquid crystal element.

FIGS. 10 and 11 are diagrams for describing a modified processing of the reflection direction of a reflection type liquid crystal element. As illustrated in FIG. 10, after the signaling light, which has a wave surface that is flat, is illuminated onto the reflection type liquid crystal elements, the ADD type switch unit 110 changes the reflection direction of the reflection type liquid crystal elements by applying a voltage for changing the refractive index to the reflection type liquid crystal elements. That is to say, as illustrated in FIG. 11, the wave surface of the light reflected by the reflection type liquid crystal elements form a saw tooth state, and the light in which the wave surface has formed a saw tooth state is output in a direction orthogonal to the wave surface. As a result, the input ports I1 through IN are optically connected to the output port O1 via the reflection type liquid crystal elements.

The description now returns to FIG. 1. The determining light input unit 120 inputs light used for determining malfunctions in the MEMS mirror of the ADD type switch unit 110 into the unused port IX in the ADD type switch unit. Specifically, the determining light input unit 120 includes a drive signal generating unit 121, a low frequency signal generating unit 122, a superimposing unit 123, and a super luminescent diode (SLD) 124.

The drive signal generating unit 121 generates a drive signal, which is a signal for driving the SLD 124, and outputs the generated drive signal to the superimposing unit 123. The low frequency signal generating unit 122 generates a low frequency signal of a frequency lower than that of the WDM signaling light, and outputs the generated low frequency signal to the superimposing unit 123 and a phase shifter 134, described later, of the light detection unit 130. The superimposing unit 123 superimposes the low frequency signal into the drive signal for the SLD 124, and outputs the drive signal into which the low frequency signal is superimposed to the SLD 124.

The SLD 124 is a light source that produces light, and generates a modulated light by performing an intensity modulation on the light produced from the SLD 124 using the low frequency signal which has been superimposed into the drive signal. The light produced from the SLD 124 resides at the 1.55 um band which is the same wavelength band as that of the WDM signaling light. The SLD 124 inputs the modulated light thus generated, which functions as the determining light, into the unused port IX in the ADD type switch unit 110.

At a state when the ADD type switch unit 110 is performing control to change the reflection direction of the MEMS mirrors, the light detection unit 130 detects the determining light, which has been input into the unused port IX in the ADD type switch unit by the determining light input unit 120, from the output light of the output port O1 in the ADD type switch unit 110. Specifically, the light detection unit 130 includes a TAP coupler 131, a photo detector (PD) 132, a band pass filter (BPF) 133, and a phase shifter 134. Also the light detection unit 130 includes a multiplying unit 135 and a low pass filter (LPF) 136.

The TAP coupler 131 divides the output light output from the output port O1 in the ADD type switch unit 110, and outputs one part of the output light obtained by the division as a main signal to an external device, and outputs the other parts of the output light to the PD 132.

The PD 132 converts the output light divided by the TAP coupler 131 into electrical signals, and outputs the converted electrical signals to the BPF 133. Hereafter, the electrical signals converted from the output light by the PD 132 are called output electrical signals.

With a frequency band including frequencies that are the same as the low frequency signal generated by the low frequency signal generating unit 122 set as the pass band, the BPF 133 extracts frequency components that have the same frequency as that of the low frequency signal from the frequency components in the output electrical signal, and outputs this to the multiplying unit 135. Hereafter, the frequency components extracted by the BPF 133 are called extracted frequency components.

The phase shifter 134 shifts the phase of the low frequency signal generated by the low frequency signal generating unit 122 toward the phase of the extracted frequency components output from the BPF 133, and outputs the low frequency signal in which the phase has been shifted to the multiplying unit 135. The multiplying unit 135 multiplies the low frequency signal and the extracted frequency components, and outputs the signal obtained as a result of the multiplication to the LPF 136. The LPF 136 equalizes the signal output from the multiplying unit 135, and outputs the equalized signal to the malfunction determining unit 140. When the value that represents the signal output from the LPF 136 is any value other than zero, the light detection unit 130 detects that the modulated light which functions as the determining light is included in the output light from the output port O1 in the ADD type switch unit 110. When the value representing the signal output from the LPF 136 is zero, the light detection unit 130 detects that the modulated light is not included in the output light from the output port O1 in the ADD type switch unit 110.

When the determining light is detected by the light detection unit 130, the malfunction determining unit 140 determines that a malfunction (abnormality) has occurred in the MEMS mirror in the ADD type switch unit 110. Specifically, when the value representing the output signal from the LPF 136 in the light detection unit 130 is any value other than zero, that is to say, when the modulated light is included in the output light from the output port O1 in the ADD type switch unit 110, the malfunction determining unit 140 determines that a malfunction has occurred in the MEMS mirrors. That is to say, when a malfunction occurs in the MEMS mirrors, the reflection direction of the MEMS mirror is not changed, and as a result, the unused port IX in the ADD type switch unit 110 is optically connected to the output port O1 via the MEMS mirror. Thus, when the modulated light that functions as the determining light input from the unused port IX is output from the output port O1, the malfunction determining unit 140 determines that a malfunction has occurred in the MEMS mirrors at a state in which the unused port IX is optically connected to the output port O1 via the MEMS mirror. The malfunction of the MEMS mirrors includes not only malfunctions in the actual MEMS mirrors, but also includes malfunctions in parts related to the MEMS mirrors, such as the electrodes illustrated in FIG. 4, the DAC, the AMP, and others for example.

Further, the malfunction determining unit 140 may be implemented as a central processing unit (CPU), or as an analysis program executed by the CPU. The malfunction determining unit 140 may also be implemented using a field programmable gate array (FPGA).

Figure 12:
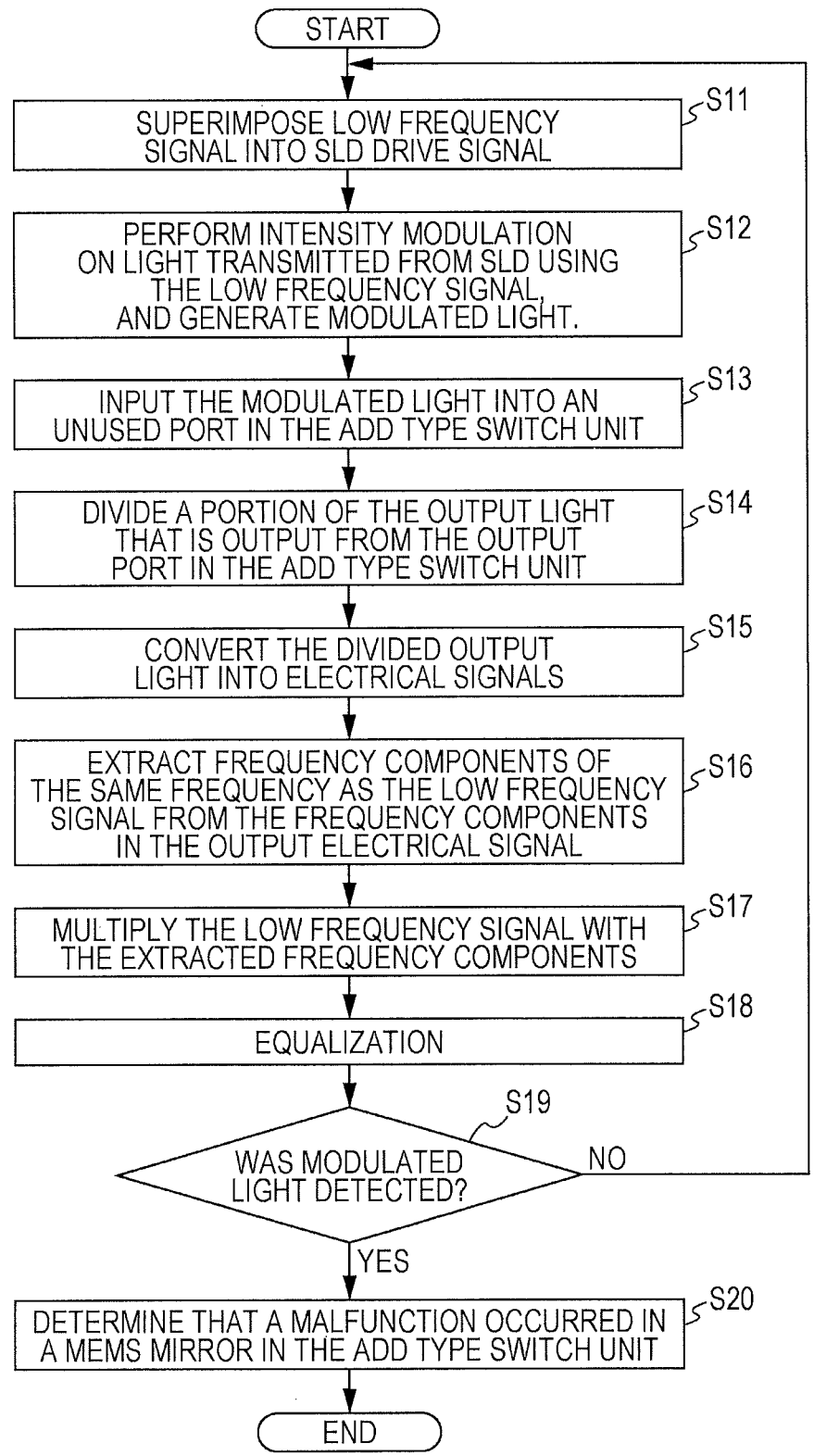
FIG. 12 is a flowchart illustrating a processing sequence of the wavelength selectable switch related to the first Embodiment.

Next, a processing sequence performed by the wavelength selectable switch 100 related to the present embodiment will be described. FIG. 12 is a flowchart illustrating a processing sequence of the wavelength selectable switch related to the first Embodiment. As illustrated in FIG. 12, the determining light input unit 120 of the wavelength selectable switch 100 superimposes the low frequency signal into the drive signal for the SLD 124 (step S11). The determining light input unit 120 generates modulated light by performing an intensity modulation on the light produced by the SLD 124 using the low frequency signal superimposed in the drive signal (step S12). The determining light input unit 120 inputs the modulated light thus generated into the unused port IX in the ADD type switch unit 110 (step S13).

The light detection unit 130 divides a portion of the output light output from the output port O1 in the ADD type switch unit 110 (step S14). The light detection unit 130 converts the divided output light into electrical signals (step S15). The light detection unit 130 extracts the frequency components of the same frequency as that of the low frequency signal from the signal components of the output electrical signal (step S16). The light detection unit 130 multiplies the low frequency signal and the extracted frequency components (step S17). The light detection unit 130 equalizes the signal obtained from the multiplication, and outputs the equalized signal to the malfunction determining unit 140 (step S18).

When the signal value output from the light detection unit 130 is zero, that is to say, when the modulated light from the output light from the output port O1 in the ADD type switch unit 110 is not detected (No in step S19), the malfunction determining unit 140 returns to step S11.

In contrast, when the signal value output from the light detection unit 130 is any other value than zero, that is to say, when the modulated light from the output light from the output port O1 in the ADD type switch unit 110 is detected (Yes in step S19), the malfunction determining unit 140 determines that a malfunction has occurred in the MEMS mirrors in the ADD type switch unit 110 (step S20). Further, the malfunction determining unit 140 may output the determination result to a predetermined output unit.

As previously described, the wavelength selectable switch 100 inputs the determining light into the unused port IX, which is optically connected to the output port O1 via the MEMS mirror in which the reflection direction is not being changed by the ADD type switch unit 110. When the determining light input into the unused port IX is detected from the output from the output port O1 in the ADD type switch unit 110, the wavelength selectable switch 100 determines that a malfunction has occurred in the MEMS mirrors in the ADD type switch unit 110. For this reason and because the wavelength selectable switch 100 may differentiate between malfunctions in external devices on the network upstream and downstream from the wavelength selectable switch 100 and malfunctions in the MEMS mirrors, malfunctions in the MEMS mirrors may be properly determined.

Also, the wavelength selectable switch 100 inputs, into the unused port IX, the modulated light, which functions as the determining light, obtained from an intensity modulation of the light from the SLD 124 using the low frequency signal, and extracts the frequency components of the same frequency as that of the low frequency signal from the frequency components of the output light from the output port O1, and so detects the modulated light. For this reason, the wavelength selectable switch 100 may detect the modulated light at a high sensitivity, and malfunctions in the MEMS mirrors may be determined with excellent accuracy.

Modification of First Embodiment

A modification of the wavelength selectable switch related to the first Embodiment will now be described. According to the first Embodiment previously described, the determining light is detected based on electrical signals converted by the PD 132 from the output light from the ADD type switch unit 110. However, the determining light may be detected based on electrical signals converted per wavelength from the output light from the ADD type switch unit 110. According to the modification of the first Embodiment, such an example in which the detection of the determining light will be described based on electrical signals converted per wavelength from the output light from the ADD type switch unit 110.

Figure 13:
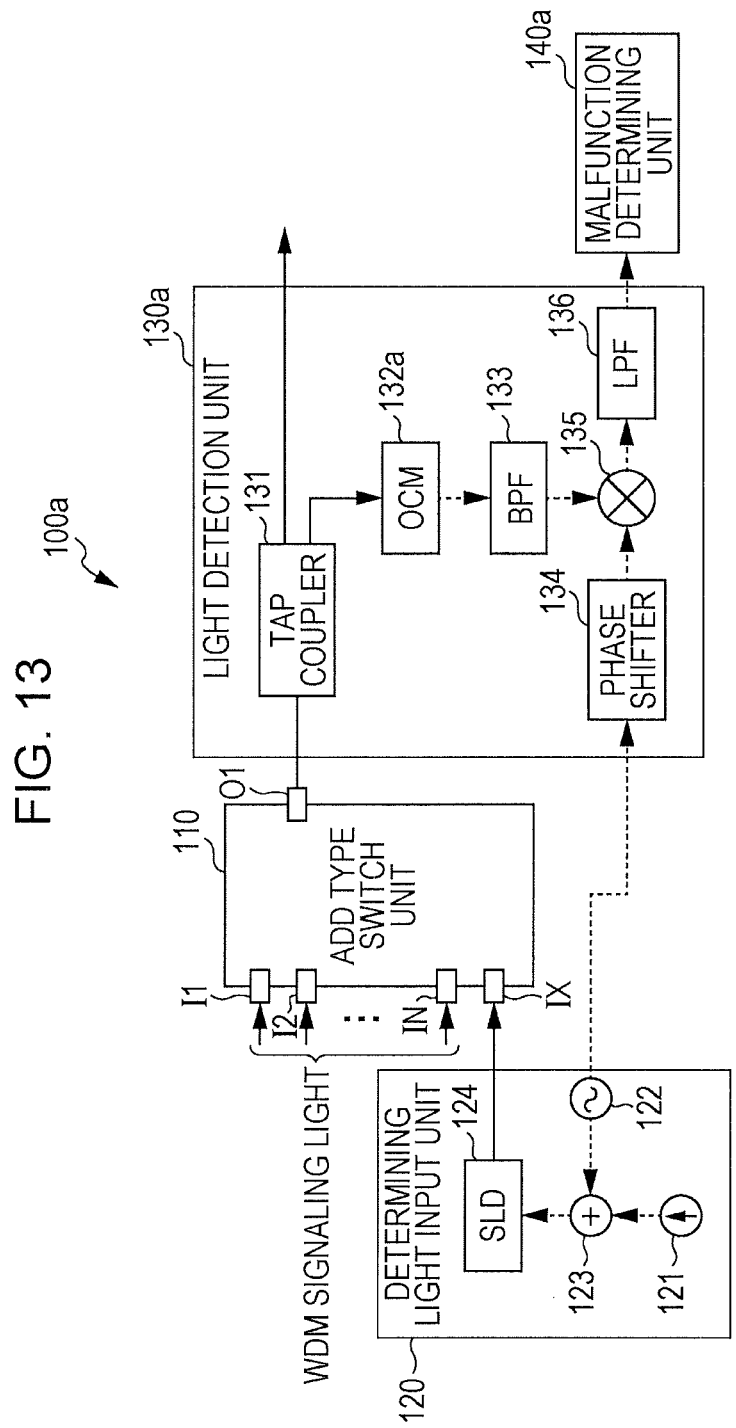
FIG. 13 is a diagram for describing a configuration of the wavelength selectable switch related to the first Embodiment.

FIG. 13 is a diagram for describing a configuration of the wavelength selectable switch related to the first Embodiment. In FIG. 13, the example uses an ADD type WSS similar to the first Embodiment. Also blocks in FIG. 13 that have the same functions as those of the first Embodiment have the same reference numerals, and so the description of similar processing is omitted. As illustrated in FIG. 13, a wavelength selectable switch 100a related to the present modification includes the ADD type switch unit 110, the determining light input unit 120, a light detection unit 130a, and a malfunction determining unit 140a.

The light detection unit 130a performs detection of the determining light per wavelength of the signaling light multiplexed into WDM signaling light. Specifically, the light detection unit 130a includes the TAP coupler 131, an OCM 132a, the BPF 133, the phase shifter 134, the multiplying unit 135, and the LPF 136.

The OCM 132a converts the output light divided by the TAP coupler 131 into electrical signals per wavelength, and outputs the electrical signals converted per wavelength to the BPF 133. Hereafter, the electrical signals converted per wavelength by the OCM 132a from the output light is called output electrical signals.

Figure 14:
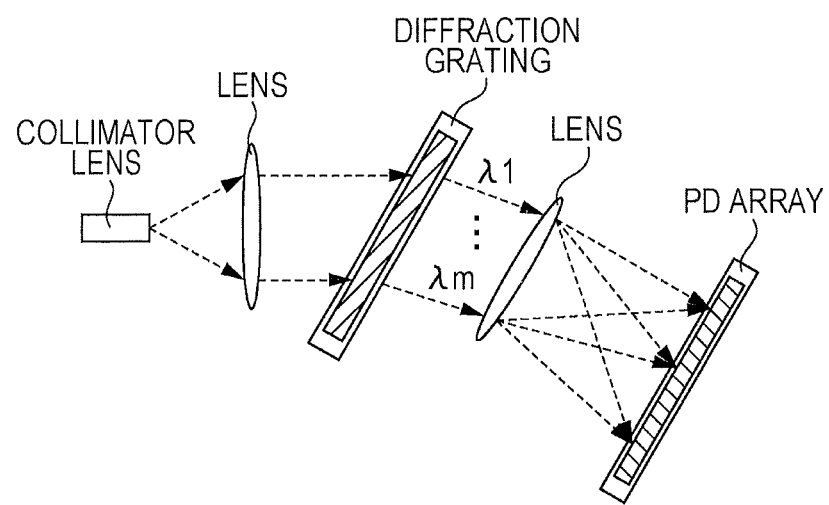
FIG. 14 is a diagram for describing an example of an OCM configuration.

FIG. 14 is a diagram for describing an example of an OCM configuration. As illustrated in FIG. 14, when light that has an m type of wavelengths λ1 through λm is input into the OCM 132a, the OCM 132a collimates the light input from the input port at a collimate lens, and illuminates this to a diffraction grating via a lens. The diffraction grating divides the input light per wavelength, and illuminates the light divided per wavelength onto a PD array via the lens. The PD array contains an m number of PDs provisioned corresponding to each wavelength, and the light divided per wavelength is converted into electrical signals by each PD.

Figure 15:
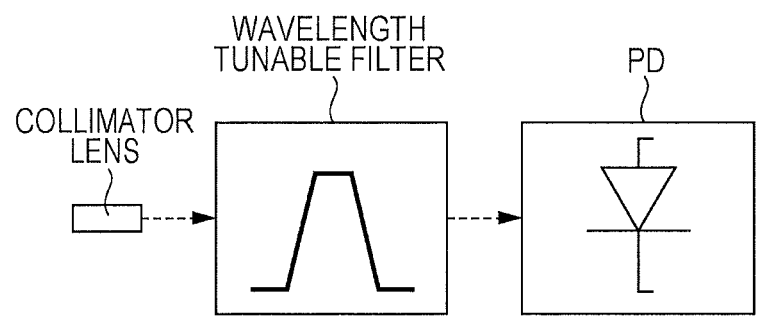
FIG. 15 is a diagram for describing another example of an OCM configuration.

FIG. 15 is a diagram for describing another example of an OCM configuration. As illustrated in FIG. 15, when the light that has an m type of wavelengths λ1 through λm is input into the OCM 132a, the OCM 132a collimates the light input from the input port at the collimate lens, and illuminates this to a wavelength tunable filter via the lens. The wavelength tunable filter has filter characteristics that enable a pass band to be changed at intervals of a predetermined time, divides the input light per wavelength, and illuminates the light divided per wavelength onto the PD array via the lens. The PD converts the light divided per wavelength into electrical signals per wavelength.

The description now returns to FIG. 13. Among the multiple MEMS mirrors in the ADD type switch unit 110, the malfunction detection unit 140a determines that an abnormality has occurred in the MEMS mirror corresponding to the wavelength for which the determining light has been detected by the light detection unit 130a. For example, when the wavelength from the modulated light, which is the determining light, detected by the light detection unit 130a is λ1, the malfunction determining unit 140a determines that an abnormality has occurred in the MEMS mirror corresponding to the wavelength λ1 from among the m number of MEMS mirrors provisioned corresponding to each wavelength.

Further, the malfunction determining unit 140a may be implemented as a CPU, or as an analysis program executed by the CPU. The malfunction determining unit 140a may also be implemented using an FPGA.

Figure 16:
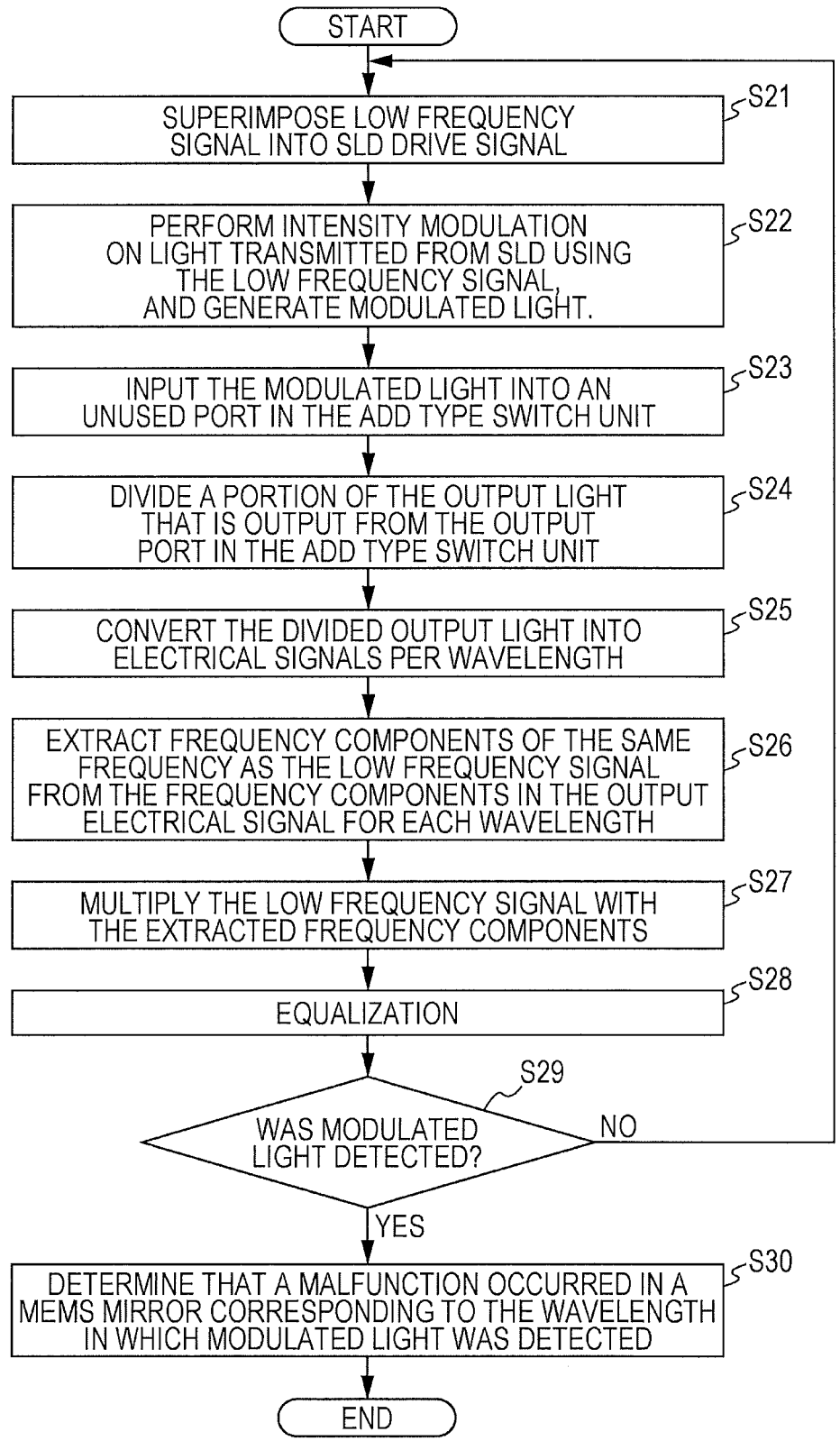
FIG. 16 is a flowchart illustrating a processing sequence of the wavelength selectable switch related to a modification of the first Embodiment.

Next, a processing sequence performed by the wavelength selectable switch 100a related to the modification of the present embodiment will be described. FIG. 16 is a flowchart illustrating a processing sequence of the wavelength selectable switch related to a modification of the first Embodiment. As illustrated in FIG. 16, the determining light input unit 120 of the wavelength selectable switch 100a superimposes the low frequency signal into the drive signal for the SLD 124 (step S21). The determining light input unit 120 generates modulated light by performing an intensity modulation on the light produced by the SLD 124 using the low frequency signal superimposed in the drive signal (step S22). The determining light input unit 120 inputs the modulated light thus generated into the unused port IX in the ADD type switch unit 110 (step S23).

The light detection unit 130a divides a portion of the output light output from the output port O1 in the ADD type switch unit 110 (step S24). The light detection unit 130a converts the divided output light into electrical signals per wavelength (step S25). The light detection unit 130a extracts the frequency components of the same frequency as that of the low frequency signal from the signal components of the output electrical signal per wavelength (step S26). The light detection unit 130a multiplies the low frequency signal and the extracted frequency components (step S27). The light detection unit 130a equalizes the signal obtained from the multiplication, and output the equalized signal to the malfunction determining unit 140a (step S28).

When the signal value output from the light detection unit 130a is zero, that is to say, when the modulated light from the output light from the output port O1 in the ADD type switch unit 110 is not detected (No in step S29), the malfunction determining unit 140 returns to step S21.

In contrast, when the signal value output from the light detection unit 130a is any other value than zero, that is to say, when the modulated light from the output light from the output port O1 in the ADD type switch unit 110 is detected (Yes in step S29), the following processing is performed. That is to say, the malfunction determining unit 140a determines that an abnormality has occurred in the MEMS mirror corresponding to the wavelength for which the modulated light has been detected by the light detection unit 130a from among the MEMS mirrors included in the ADD type switch unit 110 (step S30). Further, the malfunction determining unit 140a may output the determination result to a predetermined output unit.

As previously described, the wavelength selectable switch 100a detects the determining light per wavelength in the signaling light multiplexed into WDM signaling light, and determines that an abnormality has occurred in the MEMS mirror corresponding to the wavelength for which the determining light has been detected from among the multiple MEMS mirrors in the ADD type switch unit 110. For this reason, the wavelength selectable switch 100a may identify only the malfunctioning MEMS mirror from among the multiple MEMS mirrors corresponding to the wavelengths of the signaling light multiplexed into WDM signaling light.

Further, when the ADD type switch unit 110 includes multiple reflection type liquid crystal elements in place of the multiple MEMS mirrors, the wavelength selectable switch 100a determines that an abnormality has occurred in the reflection type liquid crystal element corresponding to the wavelength for which the determining light has been detected from among the multiple reflection type liquid crystal elements. In this case, the wavelength selectable switch 100a may identify only the malfunctioning reflection type liquid crystal element from among the reflection type liquid crystal elements corresponding to the wavelengths of the signaling light multiplexed into WDM signaling light.

Second Embodiment

According to the first Embodiment, the example given has been described wherein the modulated light obtained by performing an intensity modulation to the light produced from the light source, which functions as the determining light for determining malfunctions in the MEMS mirrors, is input into the unused port of the ADD type switch unit 110, and the modulated light is detected from the output from the output port. However, light of a wavelength band different from that of the WDM signaling light may be used as the determining light, and input into the unused port in the ADD type switch unit 110, wherein the determining light is detected from the output from the output port. The second Embodiment will be described using such an example in which light of a wavelength band different from that of the WDM signaling light may be used as the determining light, and input into the unused port in the ADD type switch unit 110, wherein the determining light is detected from the output from the output port.

Figure 17:
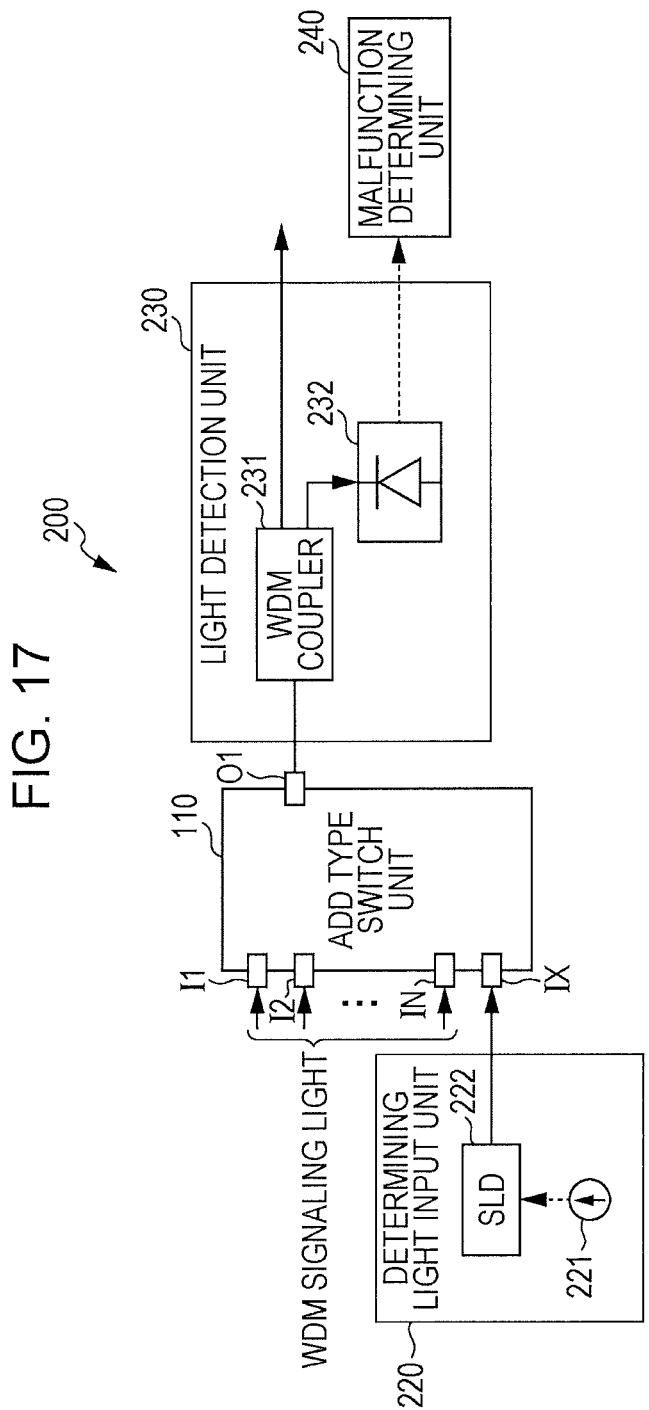
FIG. 17 is a diagram for describing a configuration of the wavelength selectable switch related to a second Embodiment.

FIG. 17 is a diagram for describing a configuration of the wavelength selectable switch related to a second Embodiment. In FIG. 17, the example uses an ADD type WSS similar to the first Embodiment. Also blocks in FIG. 17 that have the same functions as those of the first Embodiment have the same reference numerals, and so the description of similar processing is omitted. As illustrated in FIG. 17, a wavelength selectable switch 200 related to the second Embodiment includes the ADD type switch unit 110, a determining light input unit 220, a light detection unit 230, and a malfunction determining unit 240.

The determining light input unit 220 inputs, into the unused port IX in the ADD type switch unit 110, a determining light made up of light of a wavelength band that is 1/n as that of the WDM signaling light (n is an integer of 2 or more). Specifically, the determining light input unit 220 includes a drive signal generating unit 221 and an SLD 222. The drive signal generating unit 221 generates the drive signal, which is a signal for driving the SLD 222, and outputs the generated drive signal to the SLD 222.

The SLD 222 generates the light of a wavelength band that is 1/n as that of the WDM signaling light using the drive signal, and inputs the generated light that functions as the determining light into the unused port IX in the ADD type switch unit 110. For example, the SLD 222 generates light residing in the 775 nm band, which is a wavelength band that is one-half as that of the WDM signaling light, and inputs the generated light residing in the 775 nm band into the unused port IX in the ADD type switch unit 110.

Figure 18:
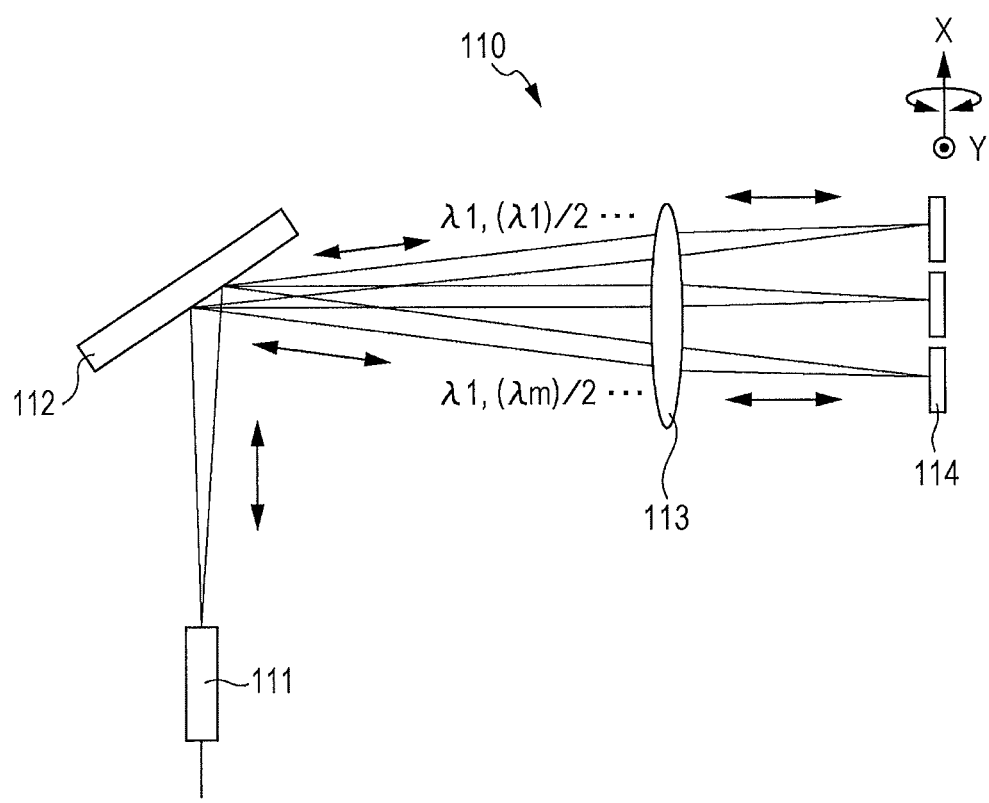
FIG. 18 is a diagram for describing an optical path for light that is one-half the wavelength band of a WDM signaling light.

FIG. 18 is a diagram for describing an optical path for light that is one-half the wavelength band as that of the WDM signaling light. FIG. 18 illustrates a state in which the WDM signaling light that has an m type of wavelengths (wavelengths: λ1 through λm) and the light of a wavelength band that is one-half the WDM signaling light are input into the ADD type switch unit 110. As illustrated in FIG. 18, the light of a wavelength λ1 and the light of a wavelength (λ1)/2, which is divided by the wavelength division unit 112 in the ADD type switch unit 110, follows the same optical path. The determining light input into the unused port IX in the ADD type switch unit 110 resides in a wavelength band that 1/n as that of the WDM signaling light. For this reason, when the unused port IX in the ADD type switch unit 110 is optically connected to the output port O1 via the MEMS mirror, the determining light input in the unused port IX is reflected by the MEMS mirror and output from the output port O1.

The description returns to FIG. 17. The light detection unit 230 includes a wavelength division coupler to set the wavelength band that is 1/n as that of the WDM signaling light (n is an integer of 2 or more) as the division band. The light detection unit 230 detects the determining light, which is input into the unused port IX in the ADD type switch unit 110 by the determining light input unit 220, from the output from the wavelength division coupler. Specifically, the light detection unit 230 includes a WDM coupler 231 and a PD 232.

The WDM coupler 231 sets the wavelength band that is 1/n as that of the WDM signaling light as the division band. The WDM coupler 231 divides the light of a wavelength band that is 1/n as that of the WDM signaling light from the output light output from the output port O1 in the ADD type switch unit 110, outputs this to the PD 232, and outputs the light of a wavelength band other than the wavelength band that is 1/n as that of the WDM signaling light to an external device as the main signal. The WDM coupler 231 is an example of the wavelength division coupler.

The PD 232 converts the light divided by the WDM coupler 231 into electrical signals, and outputs the converted electrical signals to the malfunction determining unit 240.

When the determining light is detected by the light detection unit 230, the malfunction determining unit 240 determines that a malfunction has occurred in the MEMS mirrors in the ADD type switch unit 110. Specifically, when the value representing the electrical signal output from the PD 232 in the light detection unit 230 is any value other than zero, that is to say, when the determining light is included in the output light from the output port O1 in the ADD type switch unit 110, the malfunction determining unit 240 determines that a malfunction has occurred in the MEMS mirrors. That is to say, when a malfunction occurs in the MEMS mirrors, the reflection direction of the MEMS mirror is not changed, and as a result, the unused port IX in the ADD type switch unit 110 is optically connected to the output port O1 via the MEMS mirror. Thus, when the determining light that functions as the determining light input from the unused port IX is output from the output port O1, the malfunction determining unit 240 determines that a malfunction has occurred in the MEMS mirrors at a state in which the unused port IX is optically connected to the output port O1 via the MEMS mirror. The malfunction of the MEMS mirrors includes not only malfunctions in the actual MEMS mirrors, but also included malfunctions in parts related to the MEMS mirrors, such as the electrodes illustrated in FIG. 4, the DAC, the AMP, and others for example.

Further, the malfunction determining unit 240 may be implemented as a CPU, or as an analysis program executed by the CPU. The malfunction determining unit 240 may also be implemented using an FPGA.

Figure 19:
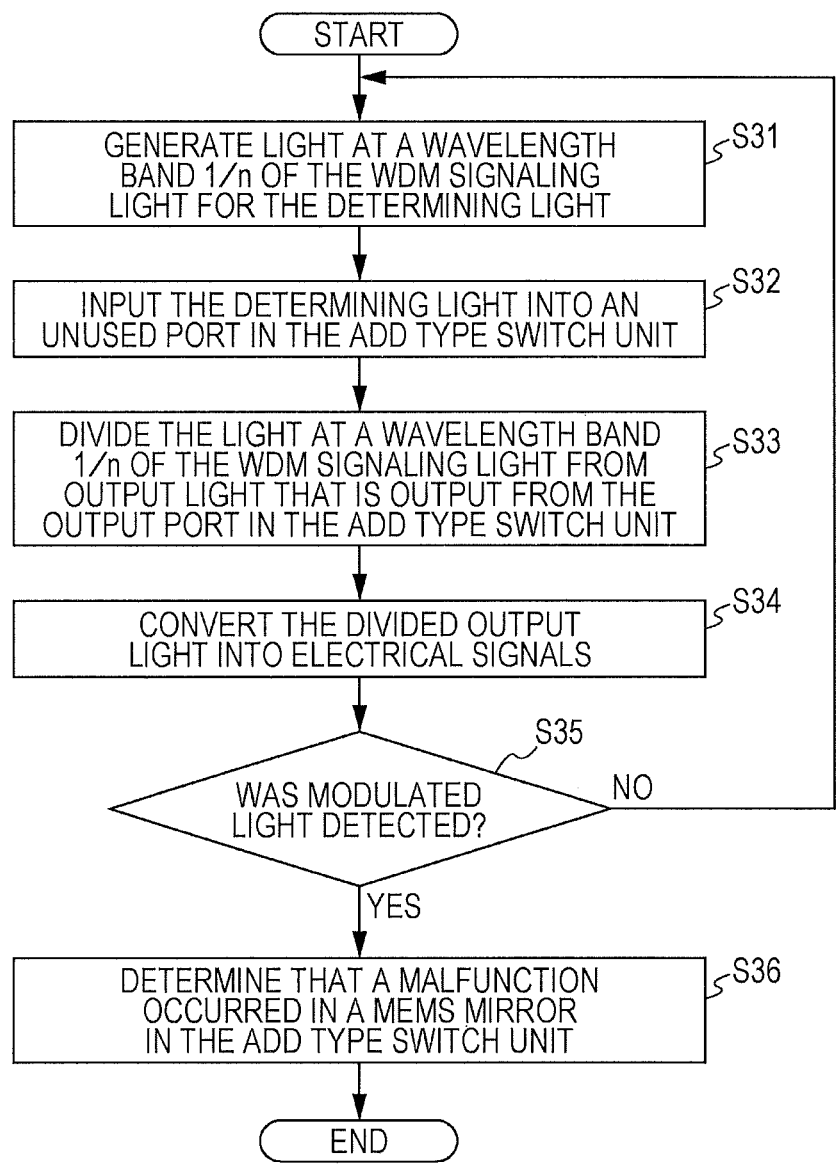
FIG. 19 is a flowchart illustrating a processing sequence of the wavelength selectable switch related to the second Embodiment.

Next, a processing sequence performed by the wavelength selectable switch 200 related to the present embodiment will be described. FIG. 19 is a flowchart illustrating a processing sequence of the wavelength selectable switch related to the present Embodiment. As illustrated in FIG. 19, the determining light input unit 220 of the wavelength selectable switch 200 generates the determining light, which is the light of a wavelength band that is 1/n as that of the WDM signaling light (step S31), and inputs the generated determining light into the unused port IX in the ADD type switch unit 110 (step S32).

The light detection unit 230 divides the light of a wavelength band that is 1/n as that of the WDM signaling light from the light output from the output port O1 in the ADD type switch unit 110 (step S33). The light determining unit 230 converts the divided light into electrical signals and outputs this to the malfunction determining unit 240 (step S34).

When the signal value representing the electrical signal output from the light detection unit 230 is zero, that is to say, when the determining light from the output light from the output port O1 in the ADD type switch unit 110 is not detected (No in step S35), the malfunction determining unit 240 returns to step S31.

In contrast, when the signal value representing the electrical signal output from the light detection unit 230 is any other value than zero, that is to say, when the determining light from the output light from the output port O1 in the ADD type switch unit 110 is detected (Yes in step S35), the malfunction determining unit 240 determines that a malfunction has occurred in the MEMS mirrors in the ADD type switch unit 110 (step S36). Further, the malfunction determining unit 240 may output the determination result to a predetermined output unit.

As previously described, the wavelength selectable switch 200 inputs the light at a wavelength band different from that of the WDM signaling light into the unused port in the ADD type switch unit 110, and when the determining light is detected from the output from the output port, a malfunction in the MEMS mirrors is determined. For this reason, regarding the wavelength selectable switch 200, components for generating the modulated light may be omitted, which enables a reduction in the number of components and thus a reduction in size of the device as compared to the configuration in which the modulated light functioning as the determining light is input into the unused port in the ADD type switch unit 110.

Modification of the Second Embodiment

A modification of the wavelength selectable switch related to the second Embodiment will now be described. According to the second Embodiment previously described, the determining light is detected based on electrical signals converted by the PD 232 from the output light from the ADD type switch unit 110. However, the determining light may be detected based on electrical signals converted per wavelength from the output light from the ADD type switch unit 110. According to the modification of the second Embodiment, the detection of the determining light will be described using such an example based on electrical signals converted per wavelength from the output light from the ADD type switch unit 110.

Figure 20:
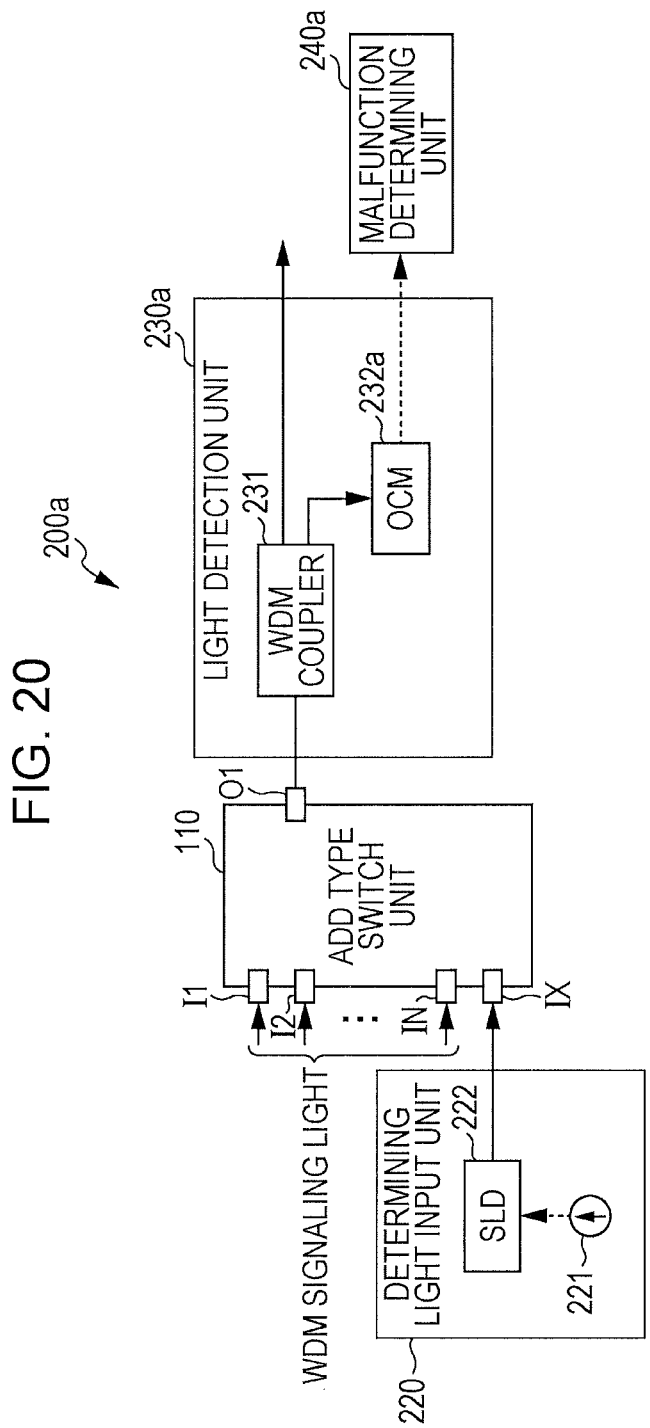
FIG. 20 is a diagram for describing a configuration of the wavelength selectable switch related to a modification of the second Embodiment.

FIG. 20 is a diagram for describing a configuration of the wavelength selectable switch related to a modification of the second Embodiment. In FIG. 20, the example uses an ADD type WSS similar to the second Embodiment. Also blocks in FIG. 20 that have the same functions as those of the second Embodiment have the same reference numerals, and so the description of similar processing is omitted. As illustrated in FIG. 20, a wavelength selectable switch 200*a* related to the present modification includes the ADD type switch unit 110, the determining light input unit 220, a light detection unit 230*a*, and a malfunction determining unit 240*a*.

The light detection unit 230*a* performs detection of the determining light per wavelength of the signaling light multiplexed into WDM signaling light. Specifically, the light detection unit 230*a* includes the WDM coupler 231 and an OCM 232*a*.

The OCM 232*a* converts the output light divided by the WDM coupler 231 into electrical signals per wavelength, and outputs the electrical signals converted per wavelength to the malfunction determining unit 240*a*.

Among the multiple MEMS mirrors in the ADD type switch unit 110, the malfunction detection unit 240*a* determines that an abnormality has occurred in the MEMS mirror corresponding to the wavelength for which the determining light has been detected by the light detection unit 230*a*. For example, when the wavelength from the determining light detected by the light detection unit 230*a* is $\lambda 1$, the malfunction determining unit 240*a* determines that an abnormality has occurred in the MEMS mirror corresponding to the wavelength $\lambda 1$ from among the m number of MEMS mirrors provisioned corresponding to each wavelength.

Further, the malfunction determining unit 240*a* may be implemented as a CPU, or as an analysis program executed by the CPU. The malfunction determining unit 240*a* may also be implemented using an FPGA.

Figure 21:
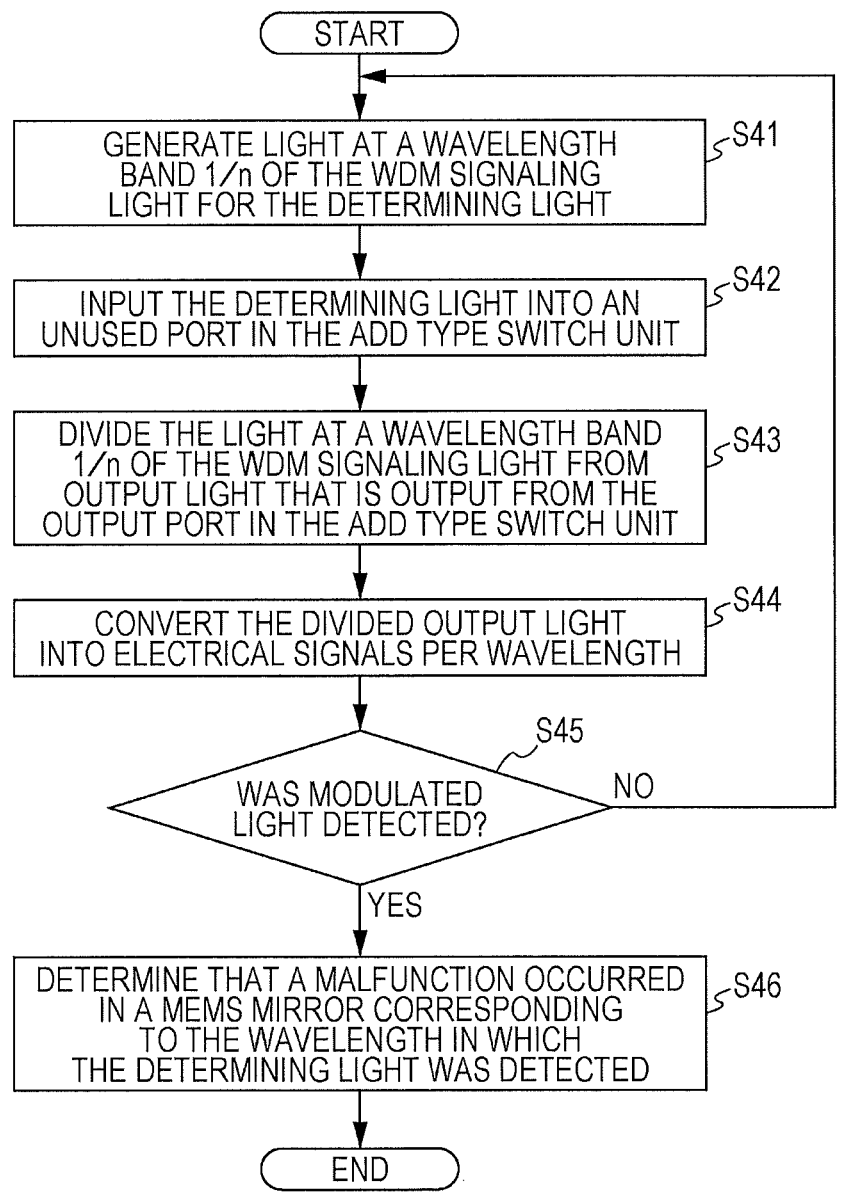
FIG. 21 is a flowchart illustrating a processing sequence of the wavelength selectable switch related to a modification of the second Embodiment.

Next, a processing sequence performed by the wavelength selectable switch 200*a* related to the modification of the present second Embodiment will be described. FIG. 21 is a flowchart illustrating a processing sequence of the wavelength selectable switch related to a modification of the second Embodiment. As illustrated in FIG. 21, the determining light input unit 220 of the wavelength selectable switch 200*a* generates the light of a wavelength band that is 1/n as that of the WDM signaling light as the determining light (step S41), and inputs the generated determining light into the unused port IX in the ADD type switch unit 110 (step S42).

The light detection unit 230*a* divides the light of a wavelength band that is 1/n as that of the WDM signaling light from the light output from the output port O1 in the ADD type switch unit 110 (step S43). The light determining unit 230*a* converts the divided light into the electrical signals per wavelength, and outputs this to the malfunction determining unit 240*a* (step S44).

When the signal value representing the electrical signal output from the light detection unit 230*a* is zero, that is to say, when the determining light from the output light from the output port O1 in the ADD type switch unit 110 is not detected (No in step S45), the malfunction determining unit 240*a* returns to step S41.

In contrast, when the signal value representing the electrical signal output from the light detection unit 230*a* is any other value than zero, that is to say, when the determining light from the output light from the output port O1 in the ADD type switch unit 110 is detected (Yes in step S45), the following processing is performed. That is to say, the malfunction determining unit 240*a* determines that an abnormality has occurred in the MEMS mirror corresponding to the wavelength for which the modulated light has been detected by the light detection unit 230*a* from among the MEMS mirrors included in the ADD type switch unit 110 (step S46). Further, the malfunction determining unit 240*a* may output the determination result to a predetermined output unit.

As previously described, the wavelength selectable switch 200*a* detects the determining light per wavelength in the signaling light multiplexed into WDM signaling light, and determines that an abnormality has occurred in the MEMS mirror corresponding to the wavelength for which the determining light has been detected from among the multiple MEMS mirrors in the ADD type switch unit 110. For this reason, wavelength selectable switch 200*a* may identify only the malfunctioning MEMS mirror from among the multiple MEMS mirrors corresponding to the wavelengths of the signaling light multiplexed into WDM signaling light.

Further, when the ADD type switch unit 110 includes multiple reflection type liquid crystal elements in place of the multiple MEMS mirrors, the wavelength selectable switch 200a determines that an abnormality has occurred in the reflection type liquid crystal element corresponding to the wavelength for which the determining light has been detected from among the multiple reflection type liquid crystal elements. In this case, the wavelength selectable switch 200a may identify only the malfunctioning reflection type liquid crystal element from among the reflection type liquid crystal elements corresponding to the wavelengths of the signaling light multiplexed into WDM signaling light.

Third Embodiment

According to the first Embodiment and the second Embodiment previously described, examples have been described in which the determining light is input into the unused port in the ADD type switch unit 110, and the determining light input into the unused port is detected from the output from the output port in the ADD type switch unit 110. However, the determining light may be input into the output port in the ADD type switch unit 110, and the determining light input into the output port may be detected from the output from the unused port in the ADD type switch unit 110. A third Embodiment will be described using such an example in which the determining light may be input into the output port in the ADD type switch unit 110, and the determining light input into the output port may be detected from the output from the unused port in the ADD type switch unit 110.

Figure 22:
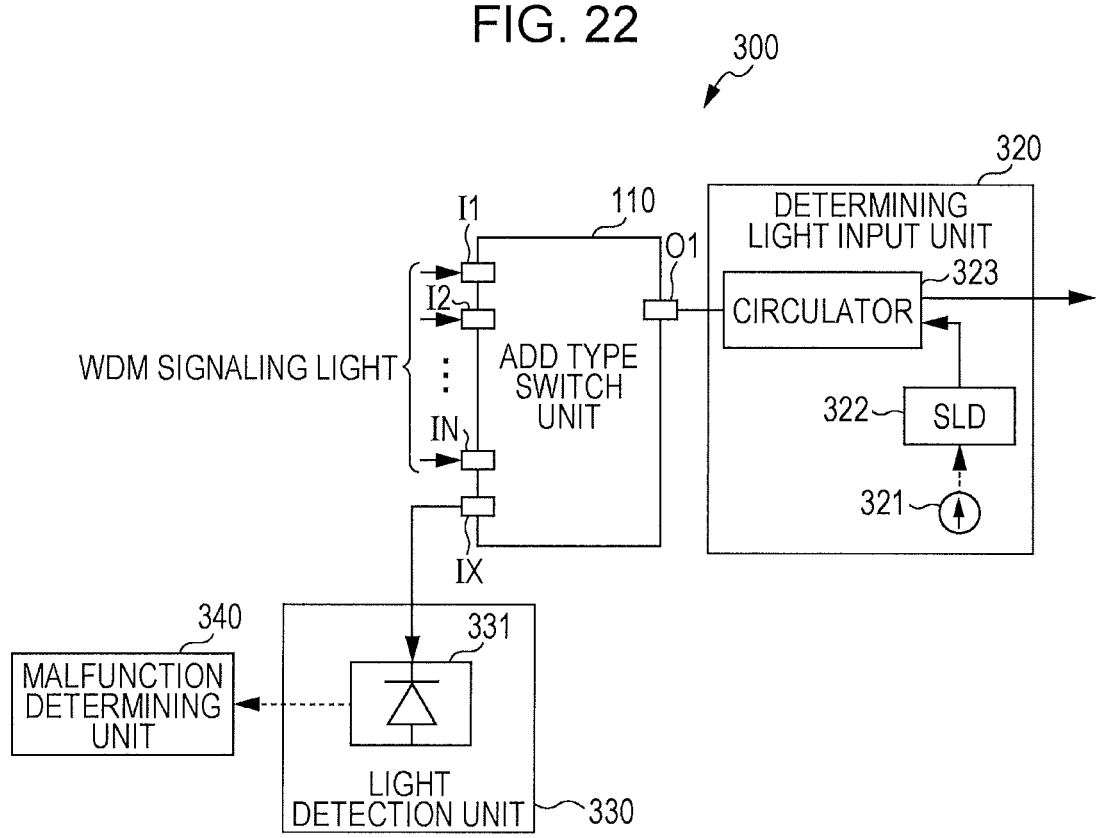
FIG. 22 is a diagram for describing a configuration of the wavelength selectable switch related to a third Embodiment.

FIG. 22 is a diagram for describing a configuration of the wavelength selectable switch related to the third Embodiment. In FIG. 22, the example uses an ADD type WSS similar to the first Embodiment. Also blocks in FIG. 22 that have the same functions as those of the first Embodiment have the same reference numerals, and so the description of similar processing is omitted. As illustrated in FIG. 22, a wavelength selectable switch 300 related to the third Embodiment includes the ADD type switch unit 110, a determining light input unit 320, a light detection unit 330, and a malfunction determining unit 340.

The determining light input unit 320 inputs the determining light, which is the light used for determining malfunctions in the MEMS mirrors in the ADD type switch unit 110, into the output port O1 in the ADD type switch unit 110. Specifically, the determining light input unit 320 includes a drive signal generating unit 321, an SLD 322, and a circulator 323.

The drive signal generating unit 321 generates a drive signal, which is a signal for driving the SLD 322, and outputs the generated drive signal to the SLD 322. The SLD 322 generates a light of a wavelength band that is the same as that of the WDM signaling light to function as the determining light, and outputs the generated determining light to the circulator 323. The circulator 323 inputs the determining light output from the SLD 322 into the output port O1 in the ADD type switch unit 110, and at the same time, outputs the output light output from the output port O1 to an external device as the main signal.

As a state in which the ADD type switch unit 110 is performing control to change the reflection direction of the MEMS mirrors, the light detection unit 330 detects the determining light, which has been input into the output port O1 in the ADD type switch unit 110 by the determining light input unit 320, from the output light from the unused port IX in the ADD type switch unit 110. Specifically, the light detection unit 330 includes a PD 331. The PD 331 converts the output light output from the unused port IX in the ADD type switch unit 110 into electrical signals, and outputs the converted electrical signals to the malfunction determining unit 340.

When the determining light is detected by the light detection unit 330, the malfunction determining unit 340 determines that a malfunction has occurred in the MEMS mirrors in the ADD type switch unit 110. Specifically, when the value representing the electrical signal output from the PD 331 in the light detection unit 330 is any value other than zero, that is to say, when the determining light is included in the output light from the unused port IX in the ADD type switch unit 110, the malfunction determining unit 340 determines that a malfunction has occurred in the MEMS mirrors. That is to say, when a malfunction occurs in the MEMS mirrors, the reflection direction of the MEMS mirror is not changed, and as a result, the unused port IX in the ADD type switch unit 110 is optically connected to the output port O1 via the MEMS mirror. Thus, when the determining light that functions as the determining light input into the output port O1 is output from the unused port IX, the malfunction determining unit 340 determines that a malfunction has occurred in the MEMS mirrors at a state in which the unused port IX is optically connected to the output port O1 via the MEMS mirror. The malfunction of the MEMS mirrors includes not only malfunctions in the actual MEMS mirrors, but also included malfunctions in parts related to the MEMS mirrors, such as the electrodes illustrated in FIG. 4, the DAC, the AMP, and others for example.

Further, the malfunction determining unit 340 may be implemented as a CPU, or as an analysis program executed by the CPU. The malfunction determining unit 340 may also be implemented using an FPGA.

Figure 23:
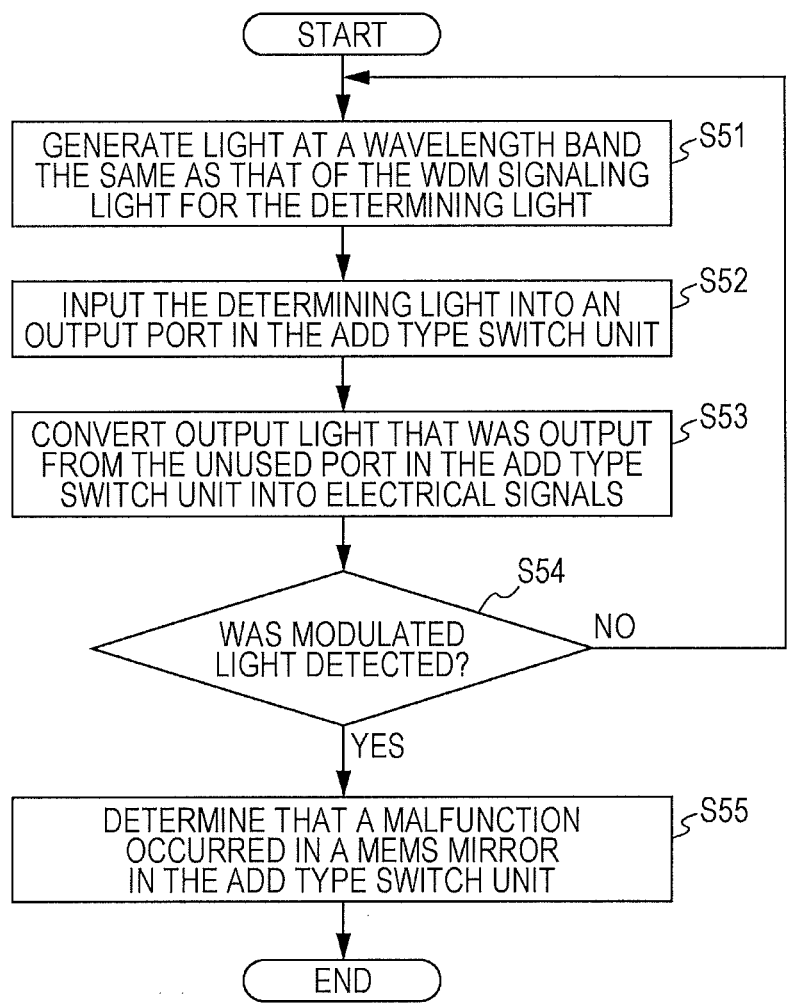
FIG. 23 is a flowchart illustrating a processing sequence of the wavelength selectable switch related to the third Embodiment.

Next, a processing sequence performed by the wavelength selectable switch 300 related to the present embodiment will be described. FIG. 23 is a flowchart illustrating a processing sequence of the wavelength selectable switch related to the third Embodiment. As illustrated in FIG. 23, the determining light input unit 320 of the wavelength selectable switch 300 generates the light of a wavelength band that is the same as that of the WDM signaling light as the determining light (step S51), and inputs the generated determining light into the output port O1 in the ADD type switch unit 110 (step S52).

The light detection unit 330 converts the output light output from the unused port IX in the ADD type switch unit 110 into electrical signals (step S53).

When the signal value representing the electrical signal output from the light detection unit 330 is zero, that is to say, when the determining light from the output light from the unused port IX in the ADD type switch unit 110 is not detected (No in step S54), the malfunction determining unit 340 returns to step S51.

In contrast, when the signal value representing the electrical signal output from the light detection unit 330 is any other value than zero, that is to say, when the determining light from the output light from the unused port IX in the ADD type switch unit 110 is detected (Yes in step S54), the following processing is performed. That is to say, the malfunction determining unit 340 determines that a malfunction has occurred in the MEMS mirrors in the ADD type switch unit 110 (step S55). Further, the malfunction determining unit 340 may output the determination result to a predetermined output unit.

As previously described, the wavelength selectable switch 300 inputs the determining light into the output port a1 which is optically connected to the unused port IX via the MEMS mirrors in which the reflection direction is not being changed by the ADD type switch unit 110. When the determining light input into the output port O1 is detected from the output from the unused port IX in the ADD type switch unit 110, the wavelength selectable switch 300 determines that a malfunction has occurred in the MEMS mirrors in the ADD type switch unit 110. For this reason and because the wavelength selectable switch 300 may differentiate between malfunctions in external devices on the network upstream and downstream from the wavelength selectable switch 300 and malfunctions in the MEMS mirrors, malfunctions in the MEMS mirrors may be properly determined.

Modification of the Third Embodiment

A modification of the wavelength selectable switch related to the third Embodiment will now be described. According to the third Embodiment previously described, the determining light is detected based on electrical signals converted by the PD 331 from the output light from the ADD type switch unit 110. However, the determining light may be detected based on electrical signals converted per wavelength from the output light from the ADD type switch unit 110. According to the modification of the third Embodiment, the detection of the determining light will be described using such an example based on electrical signals converted per wavelength from the output light from the ADD type switch unit 110.

Figure 24:
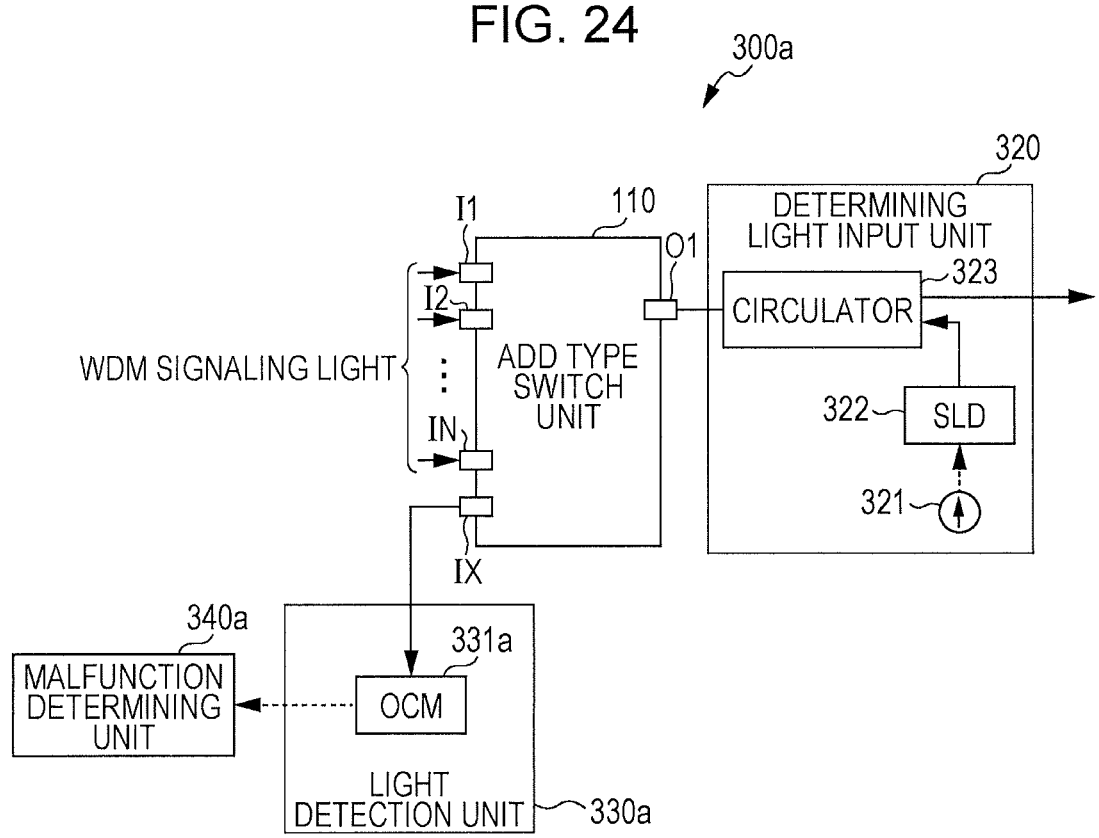
FIG. 24 is a diagram for describing a configuration of the wavelength selectable switch related to a modification of the third Embodiment.

FIG. 24 is a diagram for describing a configuration of the wavelength selectable switch related to a modification of the third Embodiment. In FIG. 24, the example uses an ADD type WSS similar to the third Embodiment. Also blocks in FIG. 24 that have the same functions as those of the third Embodiment have the same reference numerals, and so the description of similar processing is omitted. As illustrated in FIG. 24, a wavelength selectable switch 300a related to the present modification includes the ADD type switch unit 110, the determining light input unit 320, a light detection unit 330a, and a malfunction determining unit 340a.

The light detection unit 330a detects the determining light per wavelength of the signaling light multiplexed into WDM signaling light. Specifically, the light detection unit 330a includes an OCM 331a. The OCM 331a converts the output light output from the unused port IX in the ADD type switch unit 110 into electrical signals per wavelength, and outputs the electrical signals converted per wavelength to the malfunction determining unit 340a.

Among the multiple MEMS mirrors in the ADD type switch unit 110, the malfunction detection unit 340a determines that an abnormality has occurred in the MEMS mirror corresponding to the wavelength for which the determining light has been detected by the light detection unit 330a. For example, when the wavelength from the determining light detected by the light detection unit 330a is λ1, the malfunction determining unit 340a determines that an abnormality has occurred in the MEMS mirror corresponding to the wavelength λ1 from among the m number of MEMS mirrors provisioned corresponding to each wavelength.

Further, the malfunction determining unit 340a may be implemented as a CPU, or as an analysis program executed by the CPU. The malfunction determining unit 340a may also be implemented using an FPGA.

Figure 25:
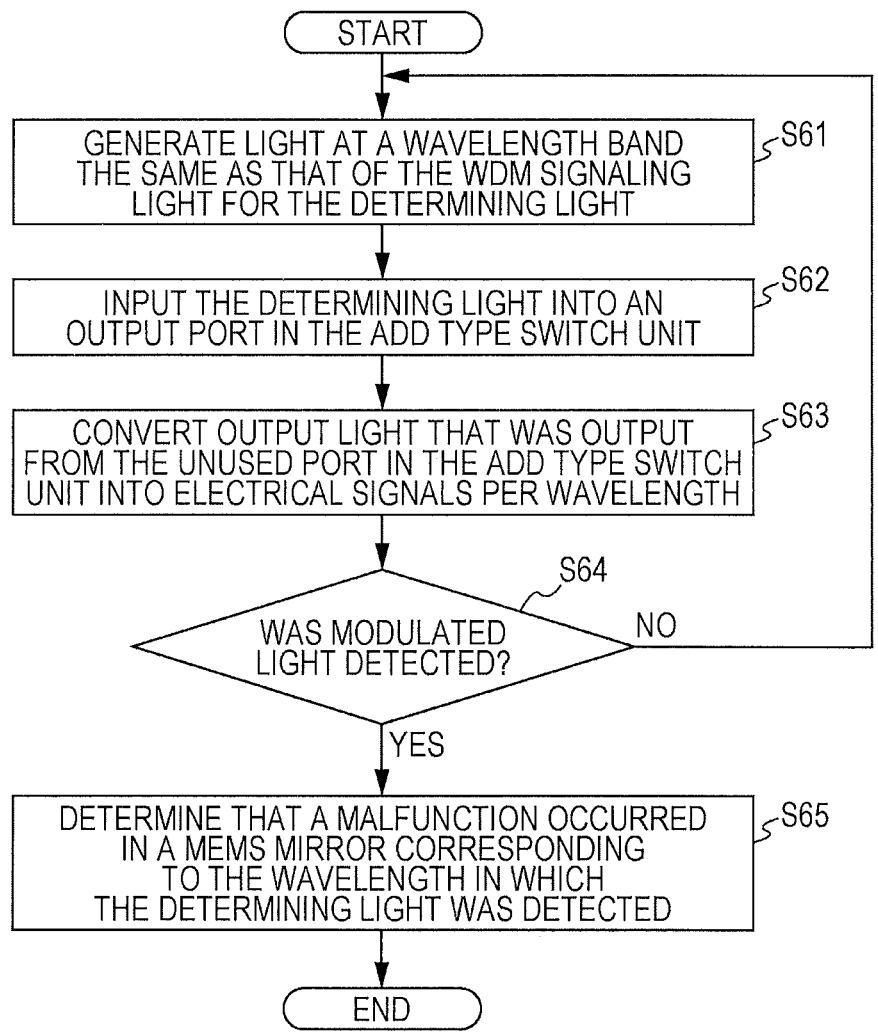
FIG. 25 is a flowchart illustrating a processing sequence of the wavelength selectable switch related to a modification of the third Embodiment.

Next, a processing sequence performed by the wavelength selectable switch 300a related to the modification of the present third Embodiment will be described. FIG. 25 is a flowchart illustrating a processing sequence of the wavelength selectable switch related to a modification of the third Embodiment. As illustrated in FIG. 25, the determining light input unit 320 of the Wavelength selectable switch 300a generates the light of a wavelength band that is the same as that of the WDM signaling light as the determining light (step S61), and inputs the generated determining light into the output port O1 in the ADD type switch unit 110 (step S62).

The light detection unit 330a converts the output light output from the unused port IX in the ADD type switch unit 110 into electrical signals per wavelength (step S63).

When the signal value representing the electrical signal output from the light detection unit 330a is zero, that is to say, when the determining light from the output light from the input port IX in the ADD type switch unit 110 is not detected (No in step S64), the malfunction determining unit 340a returns to step S61.

In contrast, when the signal value representing the electrical signal output from the light detection unit 330a is any other value than zero, that is to say, when the determining light from the output light from the unused port IX in the ADD type switch unit 110 is detected (Yes in step S64), the following processing is performed. That is to say, the malfunction determining unit 340a determines that an abnormality has occurred in the MEMS mirror corresponding to the wavelength for which the determining light has been detected (step S65). Further, the malfunction determining unit 340a may output the determination result to a predetermined output unit.

As previously described, the wavelength selectable switch 300a detects the determining light per wavelength in the signaling light multiplexed into WDM signaling light, and determines that an abnormality has occurred in the MEMS mirror corresponding to the wavelength for which the determining light has been detected from among the multiple MEMS mirrors in the ADD type switch unit 110. For this reason, wavelength selectable switch 300a may identify only the malfunctioning MEMS mirror from among the multiple MEMS mirrors corresponding to the wavelengths of the signaling light multiplexed into WDM signaling light.

Further, when the ADD type switch unit 110 includes multiple reflection type liquid crystal elements in place of the multiple MEMS mirrors, the wavelength selectable switch 300a determines that an abnormality has occurred in the reflection type liquid crystal element corresponding to the wavelength for which the determining light has been detected from among the multiple reflection type liquid crystal elements. In this case, the wavelength selectable switch 300a may identify only the malfunctioning reflection type liquid crystal element from among the reflection type liquid crystal elements corresponding to the wavelengths of the signaling light multiplexed into WDM signaling light.

Fourth Embodiment

According to the third Embodiment, an example has been described in which light of a wavelength band that is the same as that of the WDM signaling light functioning as the determining light is input into the output port in the ADD type switch unit 110, and the determining light is detected from the output from the unused port. However, light of a wavelength band that is different from that of the WDM signaling light functioning as the determining light may be input into the output port in the ADD type switch unit 110, and the determining light may be detected from the output from the unused port. A fourth Embodiment will be described using such an example in which the light of a wavelength band that is different from that of the WDM signaling light functioning as the determining light may be input into the output port in the ADD type switch unit 110, and the determining light may be detected from the output from the unused port.

Figure 26:
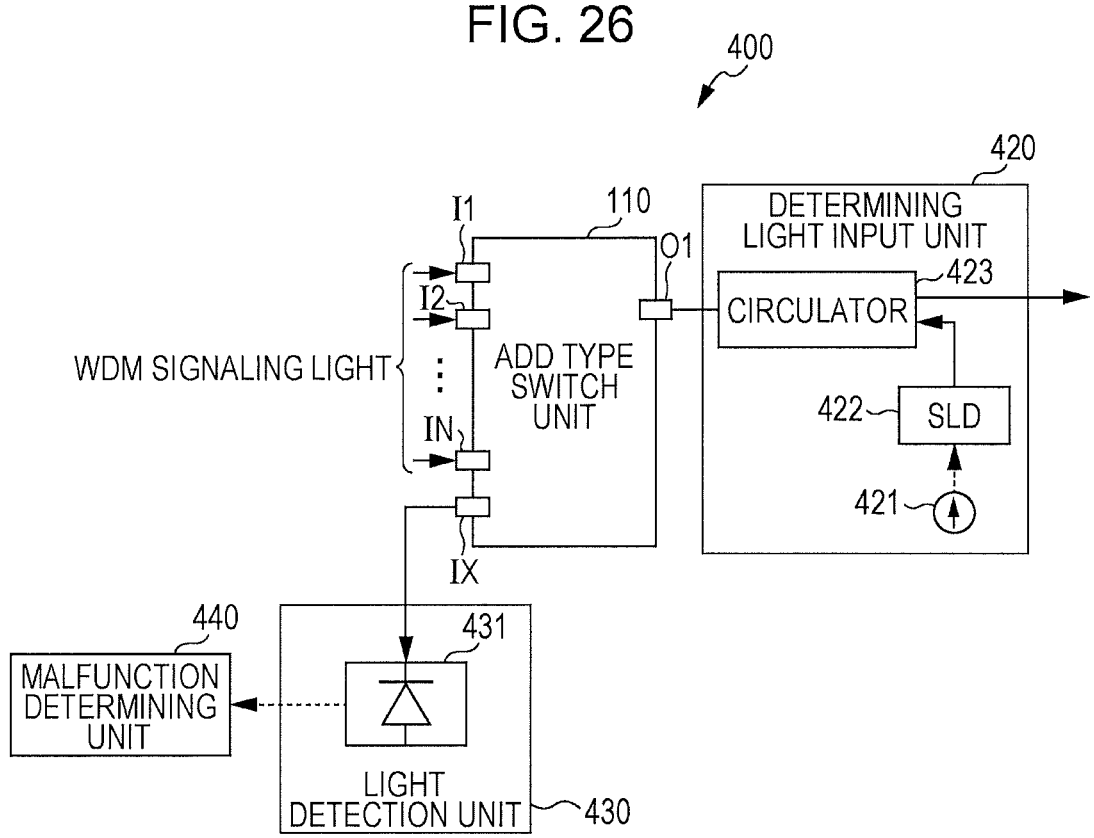
FIG. 26 is a diagram for describing a configuration of the wavelength selectable switch related to a fourth Embodiment.

FIG. 26 is a diagram for describing a configuration of the wavelength selectable switch related to a fourth Embodiment. In FIG. 26, the example uses an ADD type WSS similar to the third Embodiment. Also blocks in FIG. 26 that have the same functions as those of the third Embodiment have the same reference numerals, and so the description of similar processing is omitted. As illustrated in FIG. 26, a wavelength selectable switch 400 related to the fourth Embodiment includes the ADD type switch unit 110, a determining light input unit 420, a light detection unit 430, and a malfunction determining unit 440.

The determining light input unit 420 inputs into the output port O1 in the ADD type switch unit 110 a determining light made up of light of a wavelength band that is 1/n as that of the WDM signaling light (n is an integer of 2 or more). Specifically, the determining light input unit 420 includes a drive signal generating unit 421, an SLD 422, and a circulator 423.

The drive signal generating unit 421 generates a drive signal, which is a signal for driving the SLD 422, and outputs the generated drive signal to the SLD 422. The SLD 422 generates, as determining light, the light of a wavelength band that is 1/n as that of the WDM signaling light using the drive signal, and outputs the generated determining light to the circulator 423. The circulator 423 inputs the determining light output from the SLD 422 into the output port O1 in the ADD type switch unit 110, and at the same time, outputs the output light output from the output port O1 to an external device as the main signal. Further, a WDM coupler or other may be provisioned in place of the circulator 423.

At a state in which the ADD type switch unit 110 is performing control to change the reflection direction of the MEMS mirrors, the light detection unit 430 detects the determining light, which is input into the output port O1 in the ADD type switch unit 110 by the determining light input unit 420, from the output light from the unused port IX in the ADD type switch unit 110. Specifically, the light detection unit 430 includes a PD 431. The PD 431 converts the output light output from the unused port IX in the ADD type switch unit 110 into electrical signals, and outputs the converted electrical signals to the malfunction determining unit 440.

When the determining light is detected by the light detection unit 430, the malfunction determining unit 440 determines that a malfunction has occurred in the MEMS mirrors in the ADD type switch unit 110. Specifically, when the value representing the electrical signal from the PD 431 in the light detection unit 430 is any value other than zero, that is to say, when the determining light is included in the output light from the unused port IX in the ADD type switch unit 110, the malfunction determining unit 440 determines that a malfunction has occurred in the MEMS mirrors. That is to say, when a malfunction occurs in the MEMS mirrors, the reflection direction of the MEMS mirror is not changed, and as a result, the unused port IX in the ADD type switch unit 110 is optically connected to the output port O1 via the MEMS mirror. Thus, when the determining light that functions as the determining light input into the output port O1 is output from the unused port IX, the malfunction determining unit 440 determines that a malfunction has occurred in the MEMS mirrors at a state in which the unused port IX is optically connected to the output port O1 via the MEMS mirror. The malfunction of the MEMS mirrors includes not only malfunctions in the actual MEMS mirrors, but also included malfunctions in parts related to the MEMS mirrors, such as the electrodes illustrated in FIG. 4, the DAC, the AMP, and others for example.

Further, the malfunction determining unit 440 may be implemented as a CPU, or as an analysis program executed by the CPU. The malfunction determining unit 440 may also be implemented using an FPGA.

Figure 27:
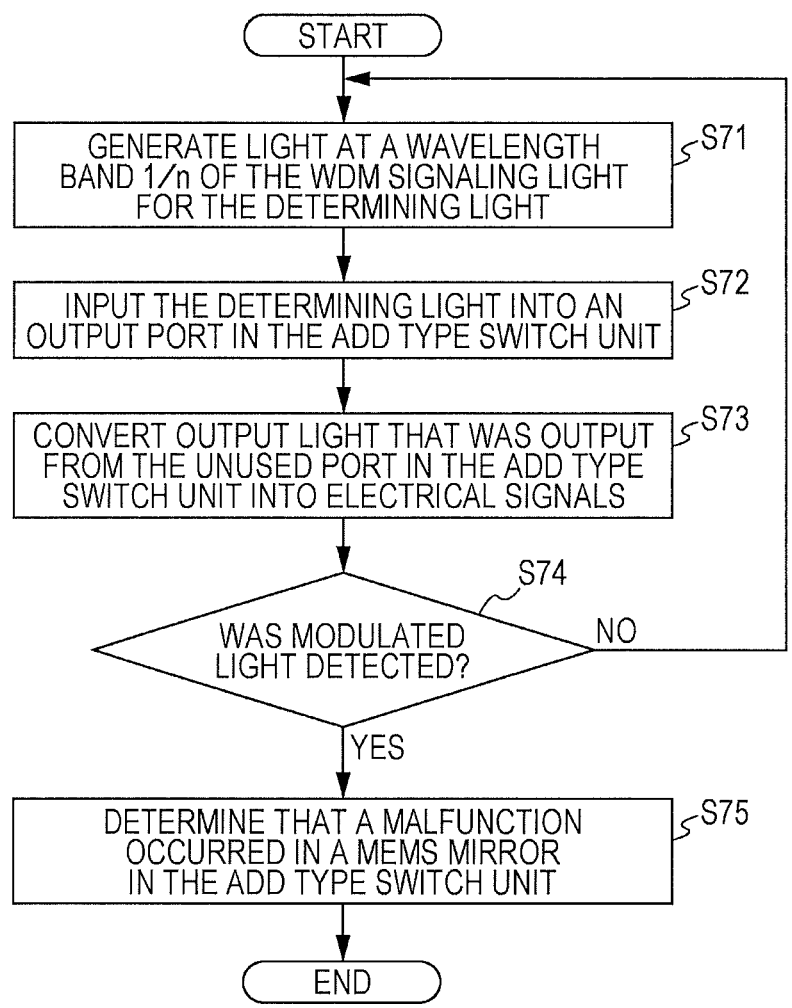
FIG. 27 is a flowchart illustrating a processing sequence of the wavelength selectable switch related to the fourth Embodiment.

Next, a processing sequence performed by the wavelength selectable switch 400 related to the present embodiment will be described. FIG. 27 is a flowchart illustrating a processing sequence of the wavelength selectable switch related to the fourth Embodiment. As illustrated in. FIG. 27, the determining light input unit 420 of the wavelength selectable switch 400 generates the light of a wavelength band that is 1/n as that of the WDM signaling light as the determining light (step S71), and inputs the generated determining light into the output port O1 in the ADD type switch unit 110 (step S72).

The light detection unit 430 converts the output light output from the unused port IX in the ADD type switch unit 110 into electrical signals (step S73).

When the signal value representing the electrical signal output from the light detection unit 430 is zero, that is to say, when the determining light from the output light from the unused port IX in the ADD type switch unit 110 is not detected (No in step S74), the malfunction determining unit 440 returns to step S71.

In contrast, when the signal value representing the electrical signal output from the light detection unit 430 is any other value than zero, that is to say, when the determining light from the output light from the unused port OX in the ADD type switch unit 110 is detected (Yes in step S74), the following processing is performed. That is to say, the malfunction determining unit 440 determines that a malfunction has occurred in the MEMS mirrors in the ADD type switch unit 110 (step S75). Further, the malfunction determining unit 440 may output the determination result to a predetermined output unit.

As previously described, the wavelength selectable switch 400 inputs, as determining light, the light at a wavelength band different from that of the WDM signaling light into the output port in the ADD type switch unit 110, and when the determining light is detected from the output from the unused port, a malfunction in the MEMS mirrors is determined. For this reason, regarding the wavelength selectable switch 400, components for generating the modulated light may be omitted, which enables a reduction in the number of components and thus a reduction in size of the device as compared to the configuration in which the modulated light functioning as the determining light is input into the output port in the ADD type switch unit 110.

Modification of the Fourth Embodiment

A modification of the wavelength selectable switch related to the fourth Embodiment will now be described. According to the fourth Embodiment previously described, the determining light is detected based on electrical signals converted by the PD 431 from the output light from the ADD type switch unit 110. However, the determining light may be detected based on electrical signals converted per wavelength from the output light from the ADD type switch unit 110. According to the modification of the fourth Embodiment, the detection of the determining light will be described using such an example based on electrical signals converted per wavelength from the output light from the ADD type switch unit 110.

Figure 28:
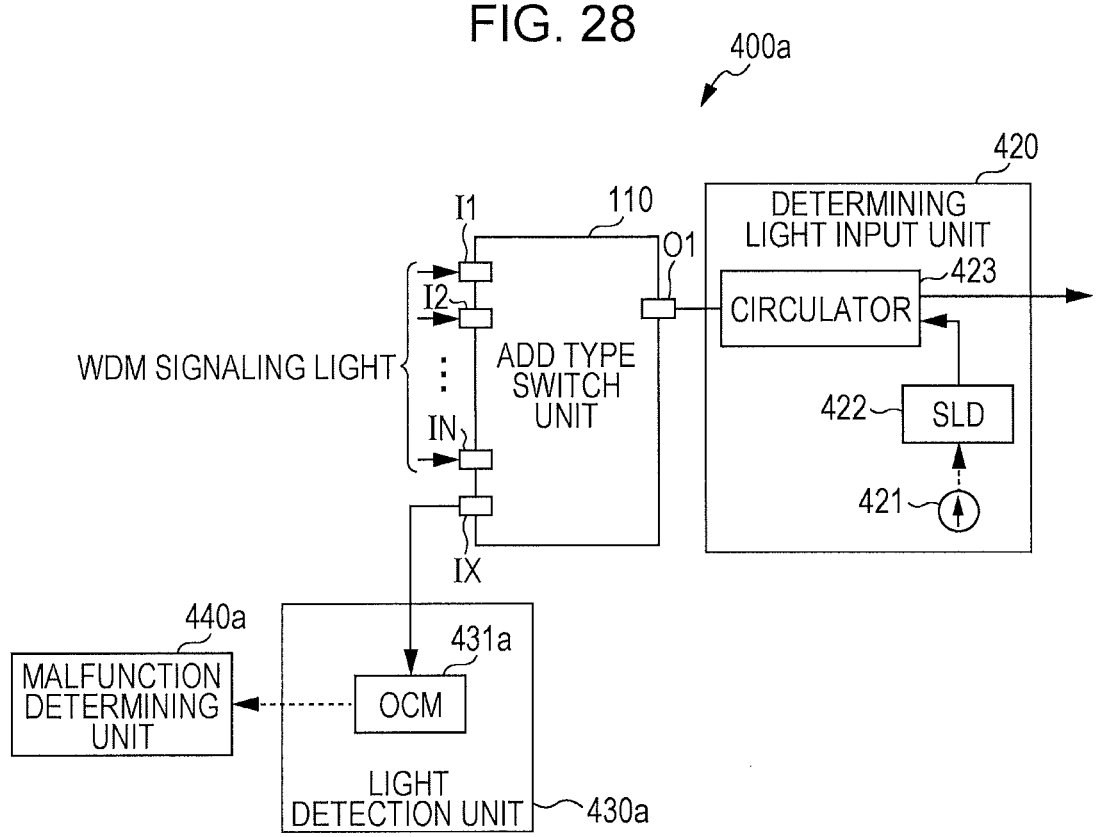
FIG. 28 is a diagram for describing a configuration of the wavelength selectable switch related to a modification of the fourth Embodiment.

FIG. 28 is a diagram for describing a configuration of the wavelength selectable switch related to a modification of the fourth Embodiment. In FIG. 28, the example uses an ADD type WSS similar to the fourth Embodiment. Also blocks in FIG. 28 that have the same functions as those of the fourth Embodiment have the same reference numerals, and so the description of similar processing is omitted. As illustrated in FIG. 28, a wavelength selectable switch 400a related to the present modification includes the ADD type switch unit 110, the determining light input unit 420, a light detection unit 430a, and a malfunction determining unit 440a.

The light detection unit 430a detects the determining light per wavelength of the signaling light multiplexed into WDM signaling light. Specifically, the light detection unit 430a includes an OCM 431a. The OCM 431a converts the output light output from the unused port IX in the ADD type switch unit 110 into electrical signals per wavelength, and outputs the electrical signals converted per wavelength to the malfunction determining unit 440a.

Among the multiple MEMS mirrors in the ADD type switch unit 110, the malfunction detection unit 440a determines that an abnormality has occurred in the MEMS mirror corresponding to the wavelength for which the determining light has been detected by the light detection unit 430a. For example, when the wavelength from the determining light detected by the light detection unit 430a is λ1, the malfunction determining unit 440a determines that an abnormality has occurred in the MEMS mirror corresponding to the wavelength λ1 from among the m number of MEMS mirrors provisioned corresponding to each wavelength.

Further, the malfunction determining unit 440a may be implemented as a CPU, or as an analysis program executed by the CPU. The malfunction determining unit 440a may also be implemented using an FPGA.

Figure 29:
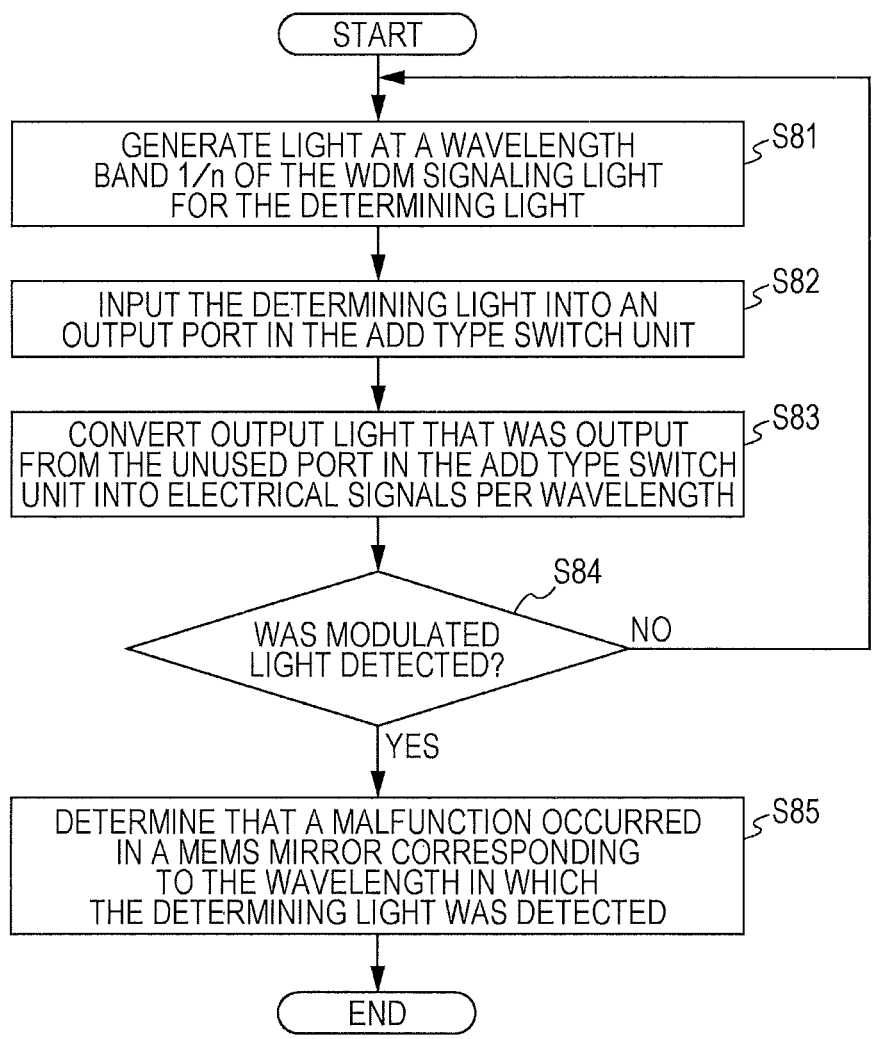
FIG. 29 is a flowchart illustrating a processing sequence of the wavelength selectable switch related to a modification of the fourth Embodiment.

Next, a processing sequence performed by the wavelength selectable switch 400a related to the modification of the present fourth Embodiment will be described. FIG. 29 is a flowchart illustrating a processing sequence of the wavelength selectable switch related to a modification of the fourth Embodiment. As illustrated in FIG. 29, the determining light input unit 420 of the wavelength selectable switch 400a generates the light of a wavelength band that is 1/n as that of the WDM signaling light as the determining light (step S81), and inputs the generated determining light into the output port O1 in the ADD type switch unit 110 (step S82).

The light detection unit 430a converts the output light output from the unused port IX in the ADD type switch unit 110 into electrical signals per wavelength (step S83).

When the signal value representing the electrical signal output from the light detection unit 430a is zero, that is to say, when the determining light from the output light from the unused port IX in the ADD type switch unit 110 is not detected (No in step S84), the malfunction determining unit 440a returns to step S81.

In contrast, when the signal value representing the electrical signal output from the light detection unit 430a is any other value than zero, that is to say, when the determining light from the output light from the unused port IX in the ADD type switch unit 110 is detected (Yes in step S84), the following processing is performed. That is to say, the malfunction determining unit 440a determines that an abnormality has occurred in the MEMS mirror corresponding to the wavelength for which the determining light has been detected (step S85). Further, the malfunction determining unit 440a may output the determination result to a predetermined output unit.

As previously described, the wavelength selectable switch 400a detects the determining light per wavelength in the signaling light multiplexed into WDM signaling light, and determines that an abnormality has occurred in the MEMS mirror corresponding to the wavelength for which the determining light has been detected from among the multiple MEMS mirrors in the ADD type switch unit 110. For this reason, wavelength selectable switch 400a may identify only the malfunctioning MEMS mirror from among the multiple MEMS mirrors corresponding to the wavelengths of the signaling light multiplexed into WDM signaling light.

Further, when the ADD type switch unit 110 includes multiple reflection type liquid crystal elements in place of the multiple MEMS mirrors, the wavelength selectable switch 400a determines that an abnormality has occurred in the reflection type liquid crystal element corresponding to the wavelength for which the determining light has been detected from among the multiple reflection type liquid crystal elements. In this case, the wavelength selectable switch 400a may identify only the malfunctioning reflection type liquid crystal element from among the reflection type liquid crystal elements corresponding to the wavelengths of the signaling light multiplexed into WDM signaling light.

Fifth Embodiment

According to the first through the fourth Embodiments, examples have been described in which an ADD type WSS is applied as the optical switch disclosed in the present application, but a DROP type WSS may also be applied as the optical switch disclosed in the present application. A fifth Embodiment will be described using such an example in which the DROP type WSS is applied as the optical switch disclosed in the present application.

Figure 30:
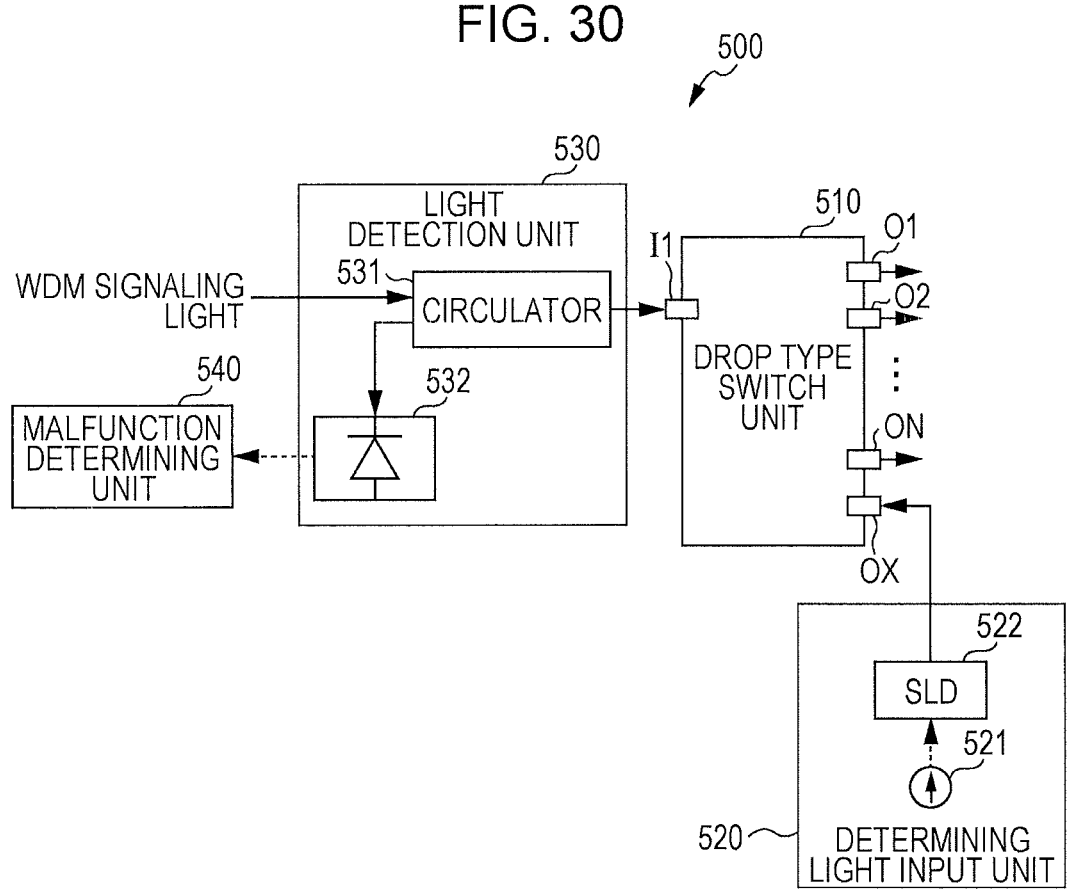
FIG. 30 is a diagram for describing a configuration of the wavelength selectable switch related to a fifth Embodiment.

FIG. 30 is a diagram for describing a configuration of the wavelength selectable switch related to a fifth Embodiment. In FIG. 30, the example uses a DROP type WSS which has one input port and multiple output ports. As illustrated in FIG. 30, the wavelength selectable switch 500 related to the fifth Embodiment includes a DROP type switch unit 510, a determining light input unit 520, a light detection unit 530, and a malfunction determining unit 540.

The DROP type switch unit 510 includes MEMS mirrors in which the reflection direction may be changed, and so by changing the reflection direction of the MEMS mirrors, a single input port I1 which receives input of WDM signaling light is optically connected to the multiple output ports O1 through ON via the MEMS mirrors. Also, when the reflection direction of the MEMS mirrors are not being changed, the drop type switch unit 510 optically connects an unused output port (hereafter, the unused port) OX to the input port I1 via the MEMS mirrors.

The configuration of the DROP type switch unit 510 will now be briefly described. The DROP type switch unit 510 includes the single input port I1, the multiple output ports O1 through ON, the single unused port OX, a first optical system, a wavelength division unit, a second optical system, and a MEMS array. The first optical system, the wavelength division unit, the second optical system, and the MEMS array are omitted from FIG. 30. Also, the DROP type switch unit 510 collimates the WDM signaling light input from the single input port I1 at the first optical system, and illuminates this to the wavelength division unit. The DROP type switch unit 510 divides the WDM signaling light per wavelength (wavelengths λ1 through λm) via the wavelength division unit. The DROP type switch unit 510 condenses the signaling light divided per wavelength at the second optical system 113, and the condensed signaling light is illuminated onto the MEMS array which contains an m number of MEMS mirrors provisioned corresponding to each of the m number of wavelengths. The m number of MEMS mirrors is an example of light reflection units.

The DROP type switch unit 510 changes the reflection direction of the MEMS mirrors so that the signaling light of a predetermined wavelength is output from an arbitrary output port from among the multiple output ports O1 through ON, and so that the input port I1 is optically connected to the output ports O1 through ON via the MEMS mirrors. Also, when reflection direction of the MEMS mirrors is not being changed, the DROP type switch unit 510 optically connects the input port I1 to the unused port OX via the MEMS mirrors. Further, the processing to change the reflection direction of the MEMS mirrors, the configuration for rotationally driving the MEMS mirrors, and similar are the same as that of the ADD type switch unit, and so their detailed descriptions are omitted here.

The determining light input unit 520 inputs the determining light, which is the light used for determining malfunctions in the MEMS mirrors in the DROP type switch unit 510, into the unused port OX in the DROP type switch unit 510. Specifically, the determining light input unit 520 includes a drive signal generating unit 521 and an SLD 522.

The drive signal generating unit 521 generates the drive signal, which is a signal for driving the SLD 522, and outputs the generated drive signal to the SLD 522. The SLD 522 generates the determining light, which is light of a wavelength band that is the same as that of the WDM signaling light using the drive signal, and inputs the generated determining light into the unused port OX in the DROP type switch unit 510.

At a state in which the DROP type switch unit 510 is performing control to change the reflection direction of the MEMS mirrors, the light detection unit 530 detects the determining light input into the unused port OX in the DROP type switch unit 510 by the determining light input unit 520, from the output light from the input port I1 in the DROP type switch unit 510. Specifically, the light detection unit 530 includes a circulator 531 and a PD 532.

The circulator 531 outputs the determining light output from the input port I1 in the DROP type switch unit 510 to the PD 532, and at the same time, outputs the WDM signaling light input from an external device to the input port in the DROP type switch unit 510. The PD 532 converts the determining light output from the circulator 531 into electrical signals, and outputs the converted electrical signals to the malfunction determining unit 540.

When the determining light is detected by the light detection unit 530, the malfunction determining unit 540 determines that a malfunction has occurred in the MEMS mirrors in the DROP type switch unit 510. Specifically, when the value representing the electrical signal from the PD 532 in the light detection unit 530 is any value other than zero, that is to say, when the determining light is included in the output light from the input port I1 in the DROP type switch unit 510, the malfunction determining unit 540 determines that a malfunction has occurred in the MEMS mirrors. That is to say, when a malfunction occurs in the MEMS mirrors, the reflection direction of the MEMS mirrors is not changed, and as a result, the unused port OX in the DROP type switch unit 510 is optically connected to the input port I1 via the MEMS mirror. Thus, when the determining light input from the unused port OX is output from the input port I1, the malfunction determining unit 540 determines that a malfunction has occurred in the MEMS mirrors at a state in which the unused port OX is optically connected to the input port I1 via the MEMS mirrors. The malfunction of the MEMS mirrors includes not only malfunctions in the actual MEMS mirrors, but also included malfunctions in parts related to the MEMS mirrors, such as the electrodes, the DAC, the AMP, and others for example.

Further, the malfunction determining unit 540 may be implemented as a CPU, or as an analysis program executed by the CPU. The malfunction determining unit 540 may also be implemented using an FPGA.

Figure 31:
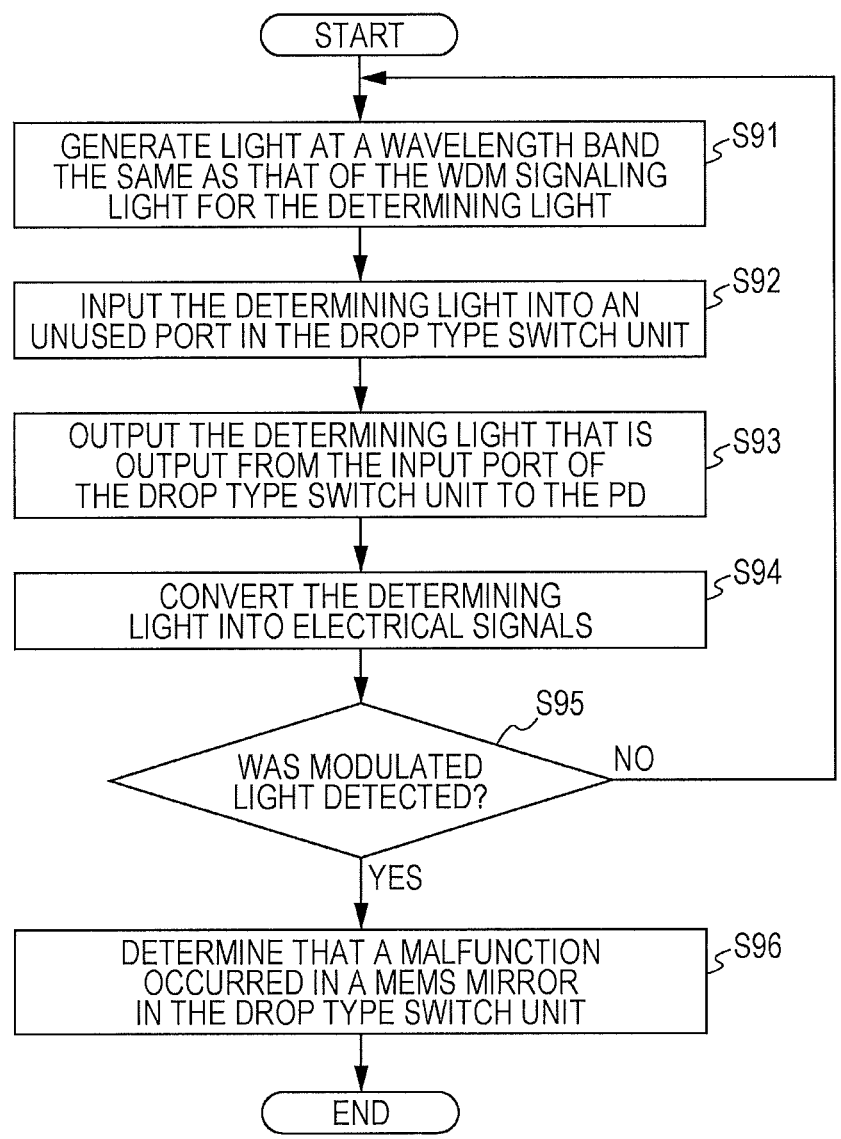
FIG. 31 is a flowchart illustrating a processing sequence of the wavelength selectable switch related to the fifth Embodiment.

Next, a processing sequence performed by the wavelength selectable switch 500 related to the present embodiment will be described. FIG. 31 is a flowchart illustrating a processing sequence of the wavelength selectable switch related to the fifth Embodiment. As illustrated in FIG. 31, the determining light input unit 520 of the wavelength selectable switch 500 generates the determining light, which is light of a wavelength band that is the same as that of the WDM signaling light (step S91), and inputs the generated determining light into the unused port OX in the DROP type switch unit 510 (step S92).

The light detection unit 530 outputs the determining light output from the input port I1 in the DROP type switch unit 510 to the PD 532 (step S93), and the determining light is converted into electrical signals by the PD 532 (step S94).

When the signal value representing the electrical signal output from the light detection unit 530 is zero, that is to say, when the determining light from the output light from the input port I1 in the DROP type switch unit 510 is not detected (No in step S95), the malfunction determining unit 540 returns to step S91.

In contrast, when the signal value representing the electrical signal output from the light detection unit 530 is any other value than zero, that is to say, when the determining light from the output light from the input port I1 in the DROP type switch unit 510 is detected (Yes in step S95), the following processing is performed. That is to say, the malfunction determining unit 540 determines that a malfunction has occurred in the MEMS mirrors in the DROP type switch unit 510 (step S96). Further, the malfunction determining unit 540 may output the determination result to a predetermined output unit.

As previously described, the wavelength selectable switch 500 inputs the determining light into the unused port OX which is optically connected to the input port I1 via the MEMS mirror in which the reflection direction is not being changed by the DROP type switch unit 510. When the determining light input into the unused port OX is detected from the output from the input port I1 in the DROP type switch unit 510, the wavelength selectable switch 500 determines that a malfunction has occurred in the MEMS mirrors in the DROP type switch unit 510. For this reason and because the wavelength selectable switch 500 may differentiate between malfunctions in external devices on the network upstream and downstream from the wavelength selectable switch 500 and malfunctions in the MEMS mirrors, malfunctions in the MEMS mirrors may be properly determined.

Modification of the Fifth Embodiment

A modification of the wavelength selectable switch related to the fifth Embodiment will now be described. According to the fifth Embodiment previously described, the determining light is detected based on electrical signals converted by the PD 532 from the output light from the DROP type switch unit 510. However, the determining light may be detected based on electrical signals converted per wavelength from the output light from the DROP type switch unit 510. According to the modification of the fifth Embodiment, the detection of the determining light will be described using such an example based on electrical signals converted per wavelength from the output light from the DROP type switch unit 510.

Figure 32:
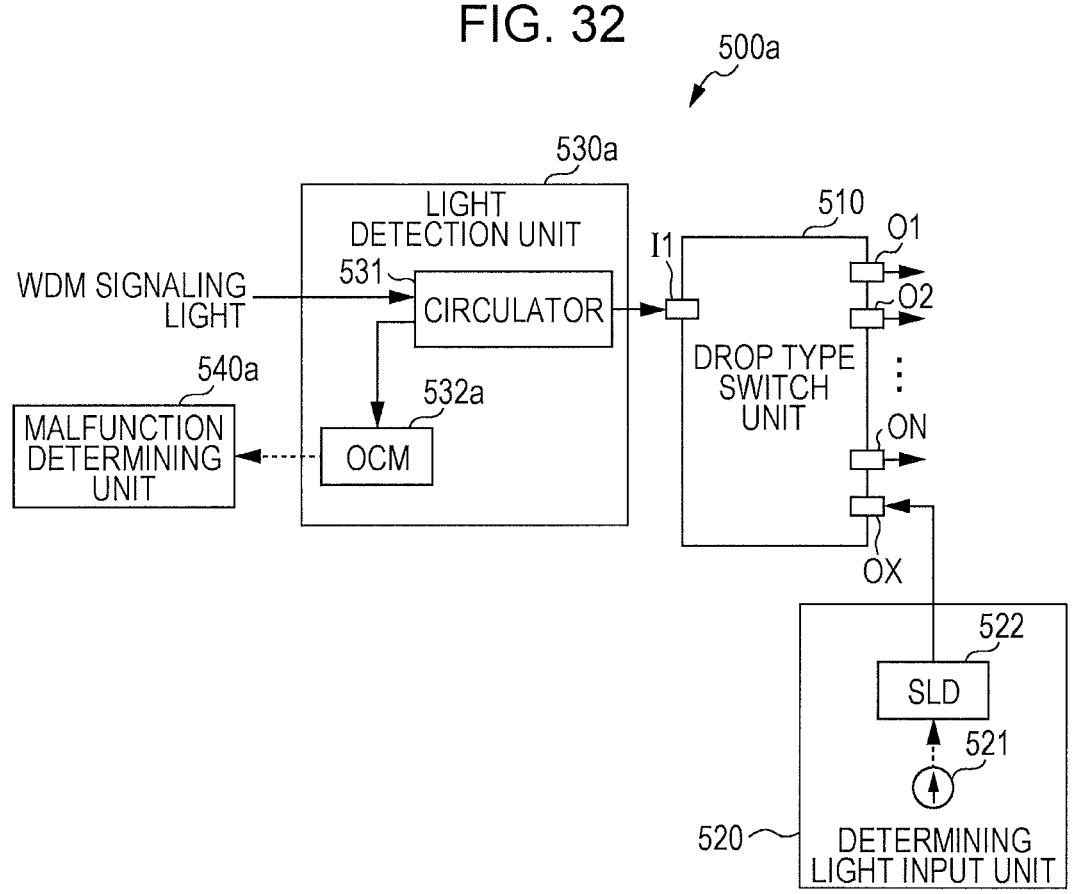
FIG. 32 is a diagram for describing a configuration of the wavelength selectable switch related to a modification of the fifth Embodiment.

FIG. 32 is a diagram for describing a configuration of the wavelength selectable switch related to the modification of the fifth Embodiment. In FIG. 32, the example uses a DROP type WSS similar to the fifth Embodiment. Also blocks in FIG. 32 that have the same functions as those of the fifth Embodiment have the same reference numerals, and so the description of similar processing is omitted. As illustrated in FIG. 32, a wavelength selectable switch 500*a* related to the present modification includes the DROP type switch unit 510, the determining light input unit 520, a light detection unit 530*a*, and a malfunction determining unit 540*a*.

The light detection unit 530*a* performs detection of the determining light per wavelength of the signaling light multiplexed into WDM signaling light. Specifically, the light detection unit 530*a* includes the circulator 531 and an OCM 532*a*. The OCM 532*a* converts the determining light output from the circulator 531 into electrical signals per wavelength, and outputs the electrical signals converted per wavelength to the malfunction determining unit 54*a*.

Among the multiple MEMS mirrors in the DROP type switch unit 510, the malfunction detection unit 540*a* determines that an abnormality has occurred in the MEMS mirror corresponding to the wavelength for which the determining light has been detected by the light detection unit 530*a*. For example, when the wavelength from the determining light detected by the light detection unit 530*a* is λ1, the malfunction determining unit 540*a* determines that an abnormality has occurred in the MEMS mirror corresponding to the wavelength λ1 from among the m number of MEMS mirrors provisioned corresponding to each wavelength.

Further, the malfunction determining unit 540*a* may be implemented as a CPU, or as an analysis program executed by the CPU. The malfunction determining unit 540*a* may also be implemented using an FPGA.

Figure 33:
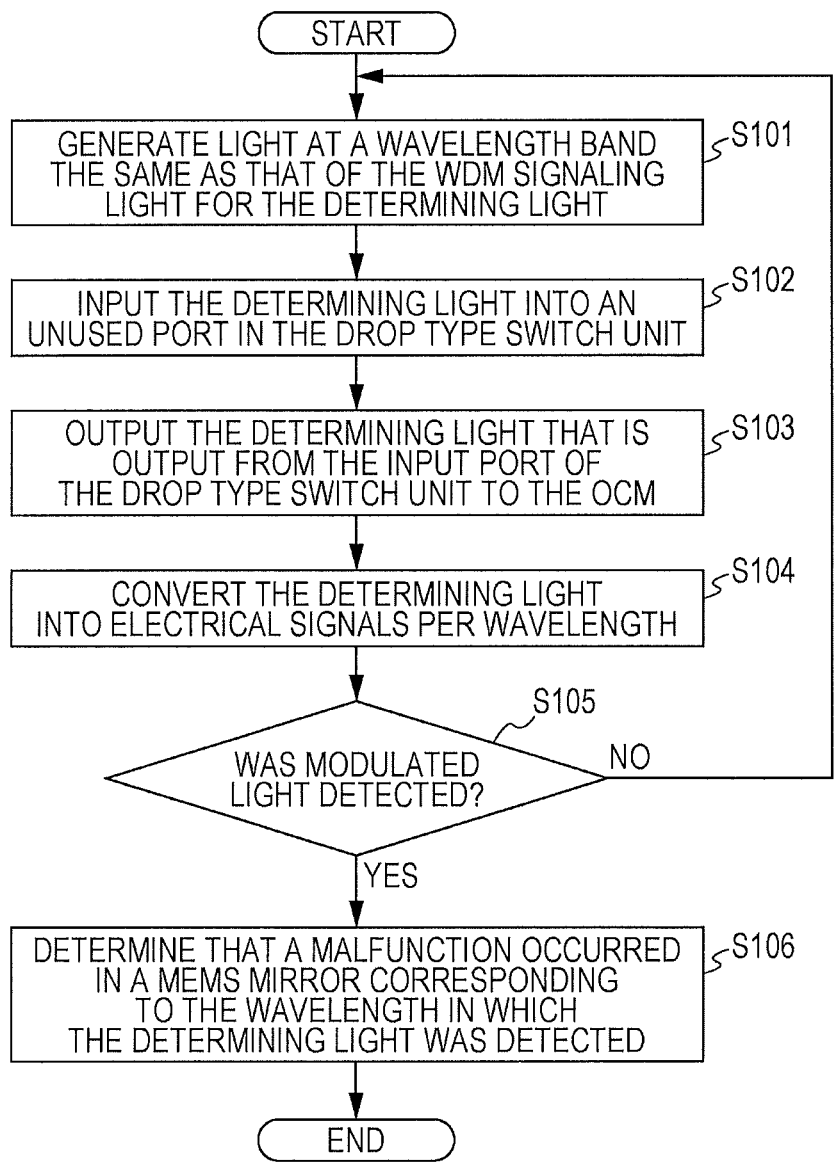
FIG. 33 is a flowchart illustrating a processing sequence of the wavelength selectable switch related to a modification of the fifth Embodiment.

Next, a processing sequence performed by the wavelength selectable switch 500*a* related to the modification of the fifth Embodiment will be described. FIG. 33 is a flowchart illustrating a processing sequence of the wavelength selectable switch related to a modification of the fifth Embodiment. As illustrated in FIG. 33, the determining light input unit 520 of the wavelength selectable switch 500*a* generates the determining light, which is light of a wavelength band that is the same as that of the WDM signaling light (step S101), and inputs the generated determining light into the unused port OX in the DROP type switch unit 510 (step S102).

The light detection unit 530*a* outputs the determining light output from the input port I1 in the DROP type switch unit 510 to the OCM (step S103), and the OCM converts the determining light into electrical signals per wavelength (step S104).

When the signal value representing the electrical signal output from the light detection unit 530*a* is zero, that is to say, when the determining light from the output light from the input port I1 in the DROP type switch unit 510 is not detected (No in step S105), the malfunction determining unit 540*a* returns to step S101.

In contrast, when the signal value representing the electrical signal output from the light detection unit 530*a* is any other value than zero, that is to say, when the determining light from the output light from the input port I1 in the DROP type switch unit 510 is detected (Yes in step S105), the following processing is performed. That is to say, the malfunction determining unit 540*a* determines that an abnormality has occurred in the MEMS mirror corresponding to the wavelength for which the determining light has been detected by the light detection unit 530*a*, from among the multiple MEMS mirrors in the DROP type switch unit 510 (step S106). Further, the malfunction determining unit 540*a* may output the determination result to a predetermined output unit.

As previously described, the wavelength selectable switch 500*a* detects the determining light per wavelength in the signaling light multiplexed into WDM signaling light, and determines that an abnormality has occurred in the MEMS mirror corresponding to the wavelength for which the determining light has been detected from among the multiple MEMS mirrors in the DROP type switch unit 510. For this reason, wavelength selectable switch 500*a* may identify only the malfunctioning MEMS mirror from among the multiple MEMS mirrors corresponding to the wavelengths of the signaling light multiplexed into WDM signaling light.

Further, when the DROP type switch unit 510 includes multiple reflection type liquid crystal elements in place of the multiple MEMS mirrors, the wavelength selectable switch 500*a* determines that an abnormality has occurred in the reflection type liquid crystal element corresponding to the wavelength for which the determining light has been detected from among the multiple reflection type liquid crystal elements. In this case, the wavelength selectable switch 500*a* may identify only the malfunctioning reflection type liquid crystal element from among the reflection type liquid crystal elements corresponding to the wavelengths of the signaling light multiplexed into WDM signaling light.

Sixth Embodiment

According to fifth Embodiment, an example has been described in which the light, functioning as the determining light, of a wavelength band that is the same as that of the WDM signaling light is input into the unused port in the DROP type switch unit 510, and the determining light is detected from the output from the input port. However, the light of a wavelength band that is different from that of the WDM signaling light may be input into the unused port in the DROP type switch unit 510 as determining light, and detected from the output from the input port. According to a sixth Embodiment, such an example will be described in which the light of a wavelength band that is different from that of the WDM signaling light may be input into the unused port in the DROP type switch unit 510 as determining light, and detected from the output from the input port.

Figure 34:
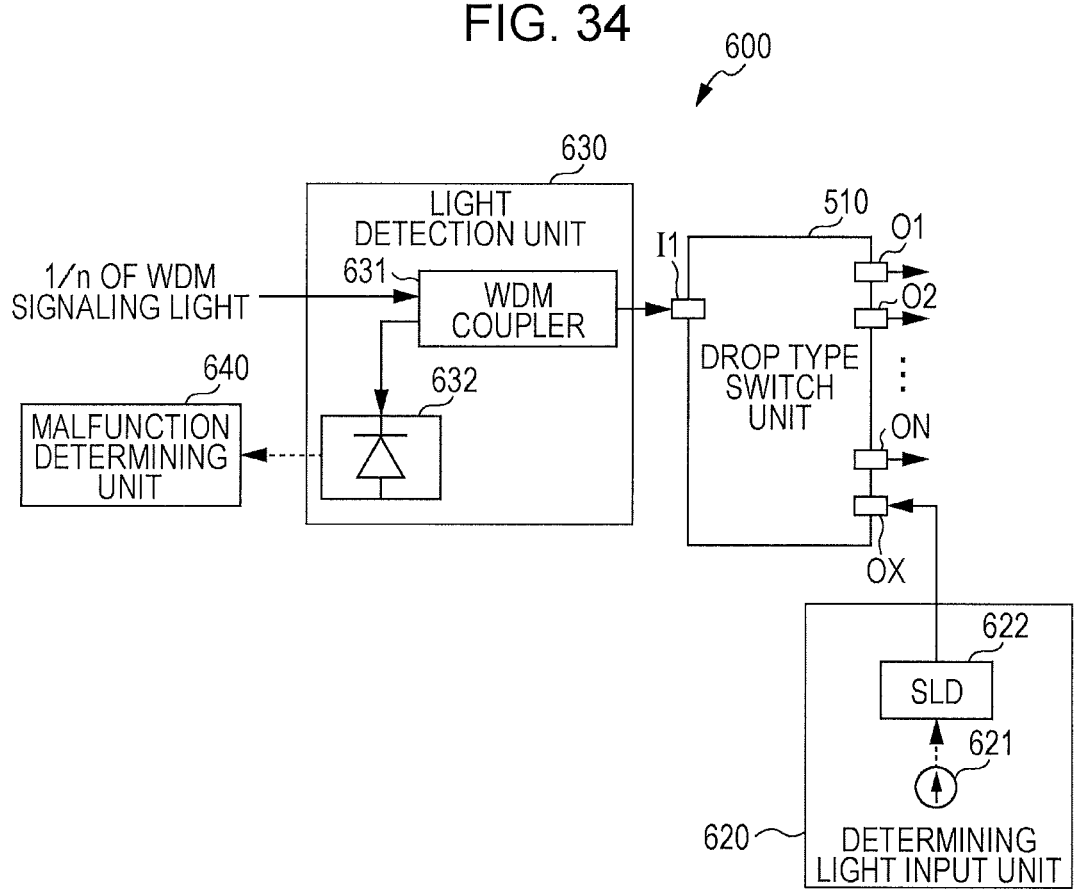
FIG. 34 is a diagram for describing a configuration of the wavelength selectable switch related to a sixth Embodiment.

FIG. 34 is a diagram for describing a configuration of the wavelength selectable switch related to the sixth Embodiment. In FIG. 34, the example uses a DROP type WSS similar to the fifth Embodiment. Also blocks in FIG. 34 that have the same functions as those of the fifth Embodiment have the same reference numerals, and so the description of similar processing is omitted. As illustrated in FIG. 34, a wavelength selectable switch 600 related to the sixth Embodiment includes the DROP type switch unit 510, a determining light input unit 620, a light detection unit 630, and a malfunction determining unit 640.

The determining light input unit 620 inputs, into the unused port OX in the DROP type switch unit 510, a determining light made up of light of a wavelength band that is 1/n as that of the WDM signaling light (n is an integer of 2 or more). Specifically, the determining light input unit 620 includes a drive signal generating unit 621 and an SLD 622.

The drive signal generating unit 621 generates a drive signal, which is a signal for driving the SLD 622, and outputs the generated drive signal to the SLD 622. The SLD 622 generates the light of a wavelength band that is 1/n as that of the WDM signaling light, as determining light, using the drive signal, and outputs the generated determining light to the unused port OX in the DROP type switch unit 510.

The light detection unit 630 includes a wavelength division coupler that sets the wavelength band that is 1/n as that of the WDM signaling light as the division band. The light detection unit 630 detects, from the output of the wavelength division coupler, the determining light input into the unused port OX in the DROP type switch unit 510 by the determining light input unit 620. Specifically, the light detection unit 630 includes a WDM coupler 631 and a PD 632.

The WDM coupler 631 sets the wavelength band that is 1/n as that of the WDM signaling light as the division band. The WDM coupler 631 divides the light of a wavelength band that is 1/n as that of the WDM signaling light from the output light output from the input port I1 in the DROP type switch unit 510, outputs this to the PD 632, and at the same time, outputs the WDM signaling light to the input port I1 in the DROP type switch unit 510. The WDM coupler 631 is an example of the wavelength division coupler.

The PD 632 converts the light divided by the WDM coupler 631 into electrical signals, and outputs the converted electrical signals to the malfunction determining unit 640.

When the determining light is detected by the light detection unit 630, the malfunction determining unit 640 determines that a malfunction has occurred in the MEMS mirrors in the DROP type switch unit 510. Specifically, when the value representing the electrical signal output from the PD 632 in the light detection unit 630 is any value other than zero, that is to say, when the determining light is included in the output light from the input port I1, the malfunction determining unit 640 determines that a malfunction has occurred in the MEMS mirrors. That is to say, when a malfunction occurs in the MEMS mirrors, the reflection direction of the MEMS mirror is not changed, and as a result, the unused port OX in the DROP type switch unit 510 is optically connected to the input port I1 via the MEMS mirrors. Thus, when the determining light input from the unused port OX is output from the input port I1, the malfunction determining unit 640 determines that a malfunction has occurred in the MEMS mirrors at a state in which the unused port OX is optically connected to the input port I1 via the MEMS mirrors. The malfunction of the MEMS mirrors includes not only malfunctions in the actual MEMS mirrors, but also included malfunctions in parts related to the MEMS mirrors, such as the electrodes, the DAC, the AMP, and others for example.

Further, the malfunction determining unit 640 may be implemented as a CPU, or as an analysis program executed by the CPU. The malfunction determining unit 640 may also be implemented using an FPGA.

Figure 35:
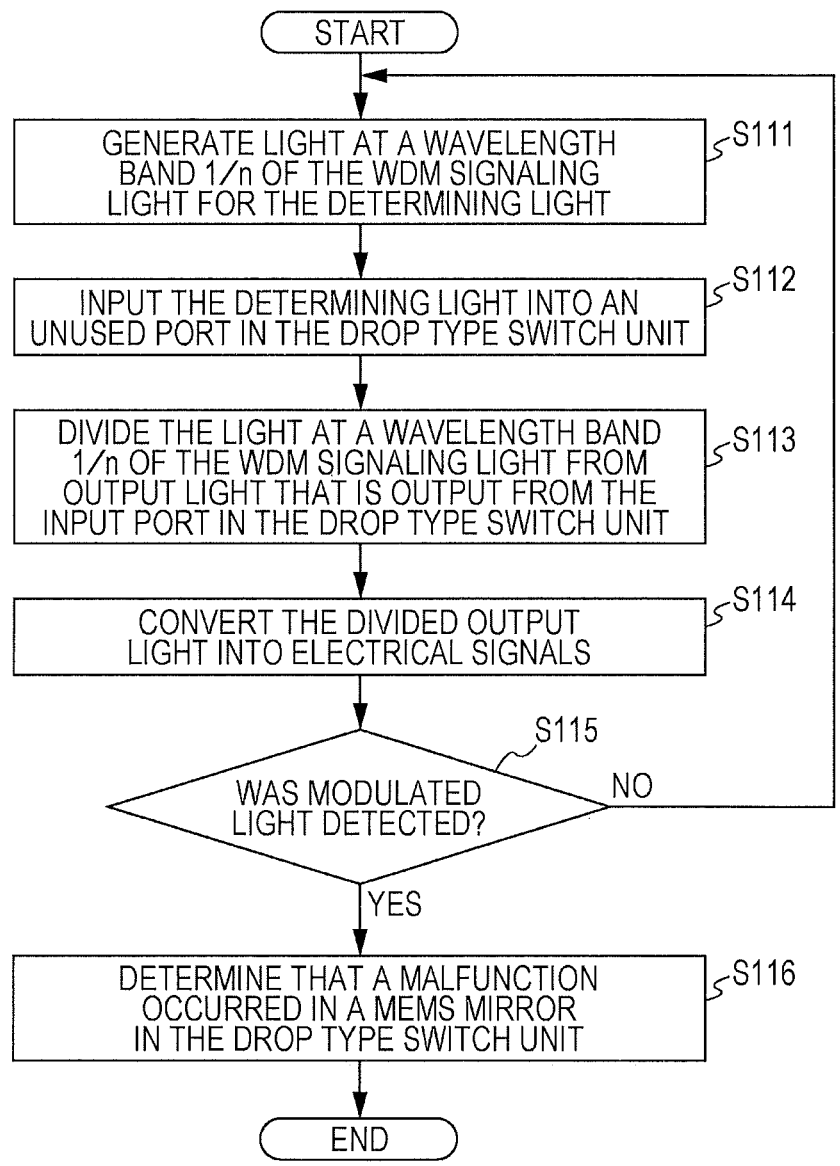
FIG. 35 is a flowchart illustrating a processing sequence of the wavelength selectable switch related to the sixth Embodiment.

Next, a processing sequence performed by the wavelength selectable switch 600 related to the present embodiment will be described. FIG. 35 is a flowchart illustrating a processing sequence of the wavelength selectable switch related to the sixth Embodiment. As illustrated in FIG. 35, the determining light input unit 620 of the wavelength selectable switch 600 generates the determining light, which is light of a wavelength band that is 1/n as that of the WDM signaling light (step S111), and inputs the generated determining light into the unused port OX in the DROP type switch unit 510 (step S112).

The light detection unit 630 divides the light of a wavelength band that is 1/n as that of the WDM signaling light from the light output from the input port I1 in the DROP type switch unit 510 (step S113). The light determining unit 630 converts the divided light into electrical signals, and outputs this to the malfunction determining unit 640 (step S114).

When the signal value representing the electrical signal output from the light detection unit 630 is zero, that is to say, when the determining light from the output light from the input port I1 in the DROP type switch unit 510 is not detected (No in step S115), the malfunction determining unit 640 returns to step S111.

In contrast, when the signal value representing the electrical signal output from the light detection unit 630 is any other value than zero (Yes in step S115), the malfunction determining unit 640 determines that a malfunction has occurred in the MEMS mirrors in the DROP type switch unit 510 (step S116). Further, the malfunction determining unit 640 may output the determination result to a predetermined output unit.

As previously described, the wavelength selectable switch 600 inputs the light at a wavelength band different from that of the WDM signaling light into the unused port in the DROP type switch unit 510, and when the determining light is detected from the output from the input port, a malfunction in the MEMS mirrors is determined. For this reason, regarding the wavelength selectable switch 600, components for generating the modulated light may be omitted, which enables a reduction in the number of components and thus a reduction in size of the device as compared to the configuration in which the modulated light functioning as the determining light is input into the unused port in the DROP type switch unit 510.

Modification of the Sixth Embodiment

A modification of the wavelength selectable switch related to the sixth Embodiment will now be described. According to the sixth Embodiment previously described, the determining light is detected based on electrical signals converted by the PD 632 from the output light from the DROP type switch unit 510. However, the determining light may be detected based on electrical signals converted per wavelength from the output light from the DROP type switch unit 510. According to the modification of the sixth Embodiment, the detection of the determining light will be described using such an example based on electrical signals converted per wavelength from the output light from the DROP type switch unit 510.

Figure 36:
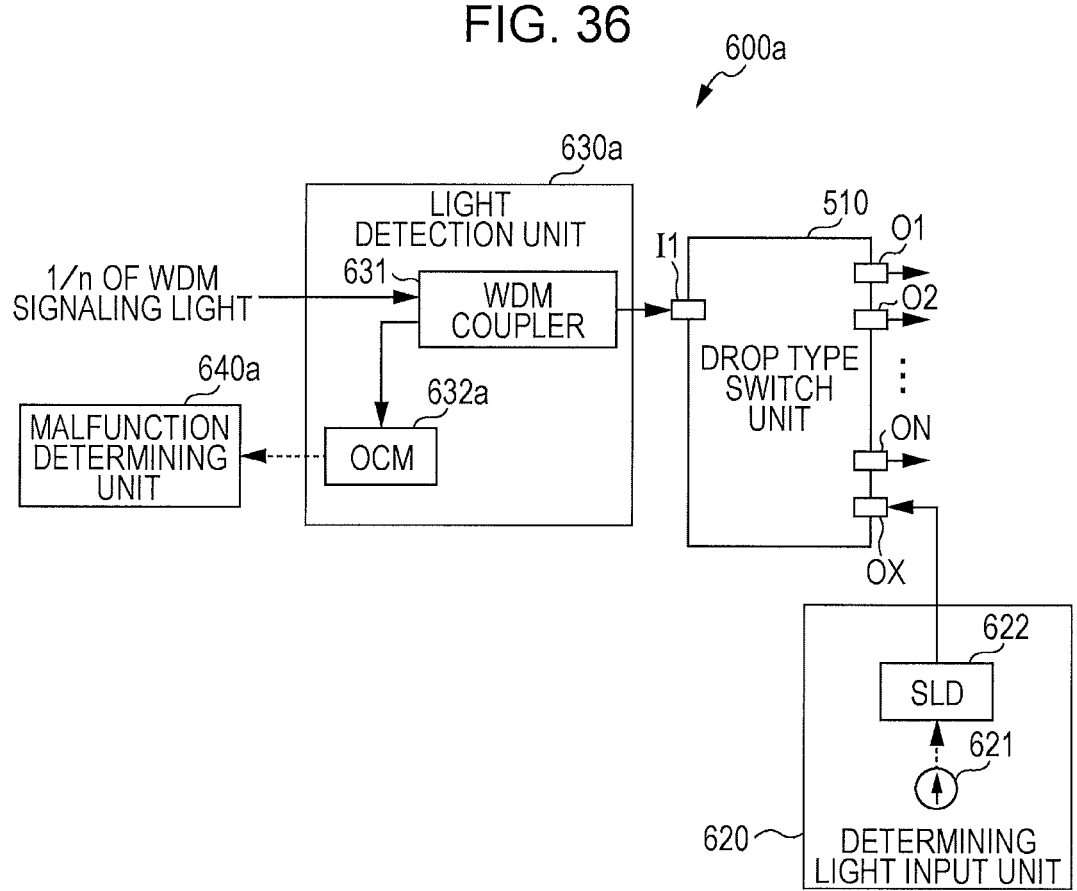
FIG. 36 is a diagram for describing a configuration of the wavelength selectable switch related to a modification of the sixth Embodiment.

FIG. 36 is a diagram for describing a configuration of the wavelength selectable switch related to a modification of the sixth Embodiment. In FIG. 36, the example uses a DROP type WSS similar to the sixth Embodiment. Also blocks in FIG. 36 that have the same functions as those of the sixth Embodiment have the same reference numerals, and so the description of similar processing is omitted. As illustrated in FIG. 36, a wavelength selectable switch 600a related to the present modification includes the DROP type switch unit 510, the determining light input unit 620, a light detection unit 630a, and a malfunction determining unit 640a.

The light detection unit 630a performs detection of the determining light per wavelength of the signaling light multiplexed into WDM signaling light. Specifically, the light detection unit 630a includes the WDM coupler 631 and an OCM 632a.

The OCM 632a converts the light divided by the WDM coupler 631 into electrical signals per wavelength, and outputs the electrical signals converted per wavelength to the malfunction determining unit 640a.

Among the multiple MEMS mirrors in the DROP type switch unit 510, the malfunction detection unit 640a determines that an abnormality has occurred in the MEMS mirror corresponding to the wavelength for which the determining light has been detected by the light detection unit 630a. For example, when the wavelength from the determining light detected by the light detection unit 630a is λ1, the malfunction determining unit 640a determines that an abnormality has occurred in the MEMS mirror corresponding to the wavelength λ1 from among the m number of MEMS mirrors provisioned corresponding to each wavelength.

Further, the malfunction determining unit 640a may be implemented as a CPU, or as an analysis program executed by the CPU. The malfunction determining unit 640a may also be implemented using an FPGA.

Figure 37:
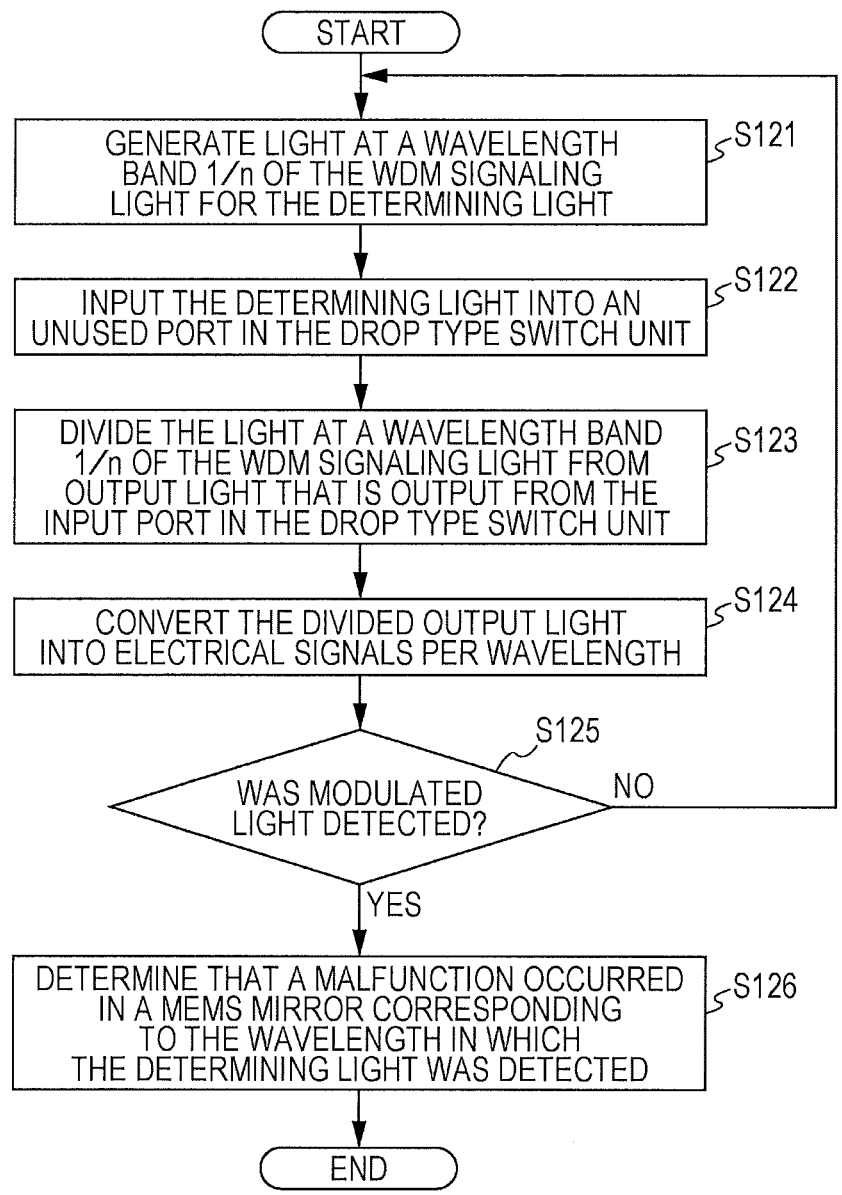
FIG. 37 is a flowchart illustrating a processing sequence of the wavelength selectable switch related to a modification of the sixth Embodiment.

Next, a processing sequence performed by the wavelength selectable switch 600a related to the modification of the present sixth Embodiment will be described. FIG. 37 is a flowchart illustrating a processing sequence of the wavelength selectable switch related to a modification of the sixth Embodiment. As illustrated in FIG. 37, the determining light input unit 620 of the wavelength selectable switch 600a generates the determining light, which is light of a wavelength band that is 1/n as that of the WDM signaling light (step S121), and inputs the generated determining light into the unused port OX in the DROP type switch unit 510 (step S122).

The light detection unit 630a divides the light of a wavelength band that is 1/n as that of the WDM signaling light from the light output from the input port I1 in the DROP type switch unit 510 (step S123). The light determining unit 630a converts the divided light into electrical signals per wavelength, and outputs this to the malfunction determining unit 640a (step S124).

When the signal value representing the electrical signal output from the light detection unit 630a is zero, that is to say, when the determining light from the output light from the input port I1 in the DROP type switch unit 510 is not detected (No in step S125), the malfunction determining unit 640a returns to step S121.

In contrast, when the signal value representing the electrical signal output from the light detection unit 630a is any other value than zero, that is to say, when the determining light from the output light from the input port I1 in the DROP type switch unit 510 is detected (Yes in step S125), the malfunction determining unit 640a performs the following processing. That is to say, the malfunction determining unit 640a determines that an abnormality has occurred in the MEMS mirror corresponding to the wavelength for which the determining light has been detected by the light detection unit 630a from among the MEMS mirrors included in the DROP type switch unit 510 (step S126). Further, the malfunction determining unit 640a may output the determination result to a predetermined output unit.

As previously described, the wavelength selectable switch 600a detects the determining light per wavelength in the signaling light multiplexed into WDM signaling light, and determines that an abnormality has occurred in the MEMS mirror corresponding to the wavelength for which the determining light has been detected from among the multiple MEMS mirrors in the DROP type switch unit 510. For this reason, wavelength selectable switch 600a may identify only the malfunctioning MEMS mirror from among the multiple MEMS mirrors corresponding to the wavelengths of the signaling light multiplexed into WDM signaling light.

Further, when the DROP type switch unit 510 includes multiple reflection type liquid crystal elements in place of the multiple MEMS mirrors, the wavelength selectable switch 600a determines that an abnormality has occurred in the reflection type liquid crystal element corresponding to the wavelength for which the determining light has been detected from among the multiple reflection type liquid crystal elements. In this case, the wavelength selectable switch 600a may identify only the malfunctioning reflection type liquid crystal element from among the multiple reflection type liquid crystal elements corresponding to the wavelengths of the signaling light multiplexed into WDM signaling light.

Seventh Embodiment

According to a seventh Embodiment, an example is described in which the wavelength selectable switch related to the previously described second Embodiment is built into an optical transmission device provisioned at a congruence point on the network.

Figure 38:
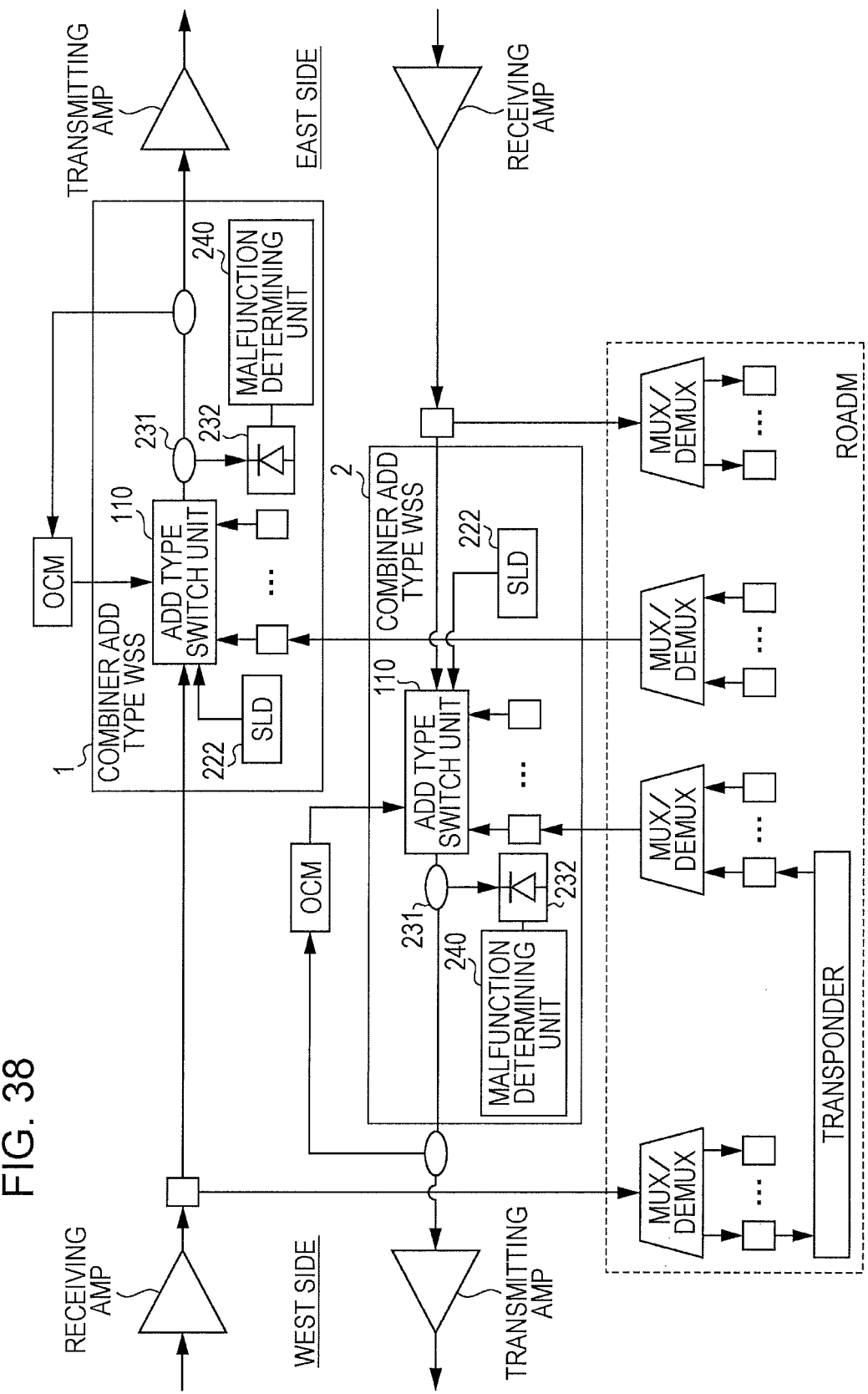
FIG. 38 is a diagram for describing a light transmit device that includes the wavelength selectable switch related to the second Embodiment.

FIG. 38 is a diagram for describing a light transmit device that includes the wavelength selectable switch related to the second Embodiment. The optical transmission device illustrated in FIG. 38 is, for example, provisioned at a congruence point on a ring type network, and transmits WDM signaling light which includes various information from the east side of the network to the west side, and from the west side to the east side. The optical transmission device includes a reconfigurable optical add/drop multiplexor (ROADM), and using the ROADM, transmits information from external terminals onto the network, and transmits information from the network to the external terminals.

Also, the optical transmission device multiplexes multiple signaling light streams using the wavelength selectable switch (WSS), and switches the information to different transmission paths by dividing the signaling light of an arbitrary wavelength from the multiplexed signaling light. As illustrated in FIG. 38, the optical transmission device includes, for example, a combiner ADD type WSS1 and a combiner ADD type WSS2. According to the present embodiment, the wavelength selectable switch 200 related to the second Embodiment is built in within the combiner ADD type WSS1 and the combiner ADD type WSS2.

The combiner ADD type WSS1 multiplexes a signaling light of a predetermined wavelength transferred from the ROADM, which received the signaling light from the receiving amp on the west side of the network, and transfers this to the transmission amp on the east side. The power for each wavelength of the signaling light transferred by the transmission amp on the east side is measured by an OCM, and the measurement result is sent to the combiner ADD type WSS1 as feedback. The ADD type switch unit 110 in the combiner ADD type WSS1 changes the reflection direction of the MEMS mirrors so as to equalize the power for each wavelength using the measurement result received as feedback.

The combiner ADD type WSS2 multiplexes a signaling light of a predetermined wavelength transferred from the ROADM, which received the signaling light from the receiving amp on the east side of the network, and transfers this to the transmission amp on the west side. The power for each wavelength of the signaling light transferred by the transmission amp on the west side is measured by an OCM, and the measurement result is sent to the combiner ADD type WSS2 as feedback. The ADD type switch unit 110 in the combiner ADD type WSS2 changes the reflection direction of the MEMS mirrors so as to equalize the power for each wavelength using the measurement result received as feedback.

The ROADM includes a transponder and a multiplexer/demultiplexer (MUX/DEMUX). Also, when transmitting information received from external terminals and such onto the network, the transponder converts the information received from the terminals and such into a suitable signaling rate, and corrects any errors as a result of forward error correction (FEC) and such. Also, the transponder modulates the output wavelength to an arbitrary wavelength using a laser, and outputs this to the MUX/DEMUX.

The MUX/DEMUX multiplexes signaling light of multiple, identifiable wavelengths into one signaling light stream, and divides the signaling light of an identifiable wavelength from the multiplexed signaling light. For example, the MUX/DEMUX multiplexes only the signaling light of several identifiable wavelengths from among the signaling light input from the transponder into a single signaling light stream, and transfers this to the combiner ADD type WSS1 and the combiner ADD type WSS2.

As previously described, the optical transmission device according to the present embodiment switches the information between transfer paths at a congruence point on the network using the combiner type WSS1 and the combiner type WSS2. The optical transmission device according to the present embodiment provisions the wavelength selectable switch 200 related to the second Embodiment within the combiner ADD type WSS1 and the combiner ADD type WSS2. For this reason, the optical transmission device may differentiate between and determine malfunctions in devices provisioned on the network upstream and downstream from the combiner ADD type WSS1 and the combiner ADD type WSS2, and malfunctions in the MEMS mirrors in the combiner ADD type WSS1 and the combiner ADD type WSS2.

For example, let us assume that the power of an identifiable wavelength becomes undetectable by the OCM on the east side, which is downstream from the combiner ADD type WSS1. In this case, the optical transmission device may differentiate between and determine malfunctions in the OCM on the east side or malfunctions in the ROADM on the west side, which is upstream from the combiner ADD type WSS1, and malfunctions in the MEMS mirrors in the combiner ADD type WSS1.

Further, according to the present embodiment, an example has been described in which the wavelength selectable switch related to the second Embodiment is built in the optical transmission device provisioned at a congruence point on the network, but the wavelength selectable switches related to the first and fourth Embodiments previously described may also be built in.

Eighth Embodiment

According to the present embodiment, an example will be described in which the wavelength selectable switch related to the fifth Embodiment is built into the optical transmission device provisioned at a divergence point on the network.

Figure 39:
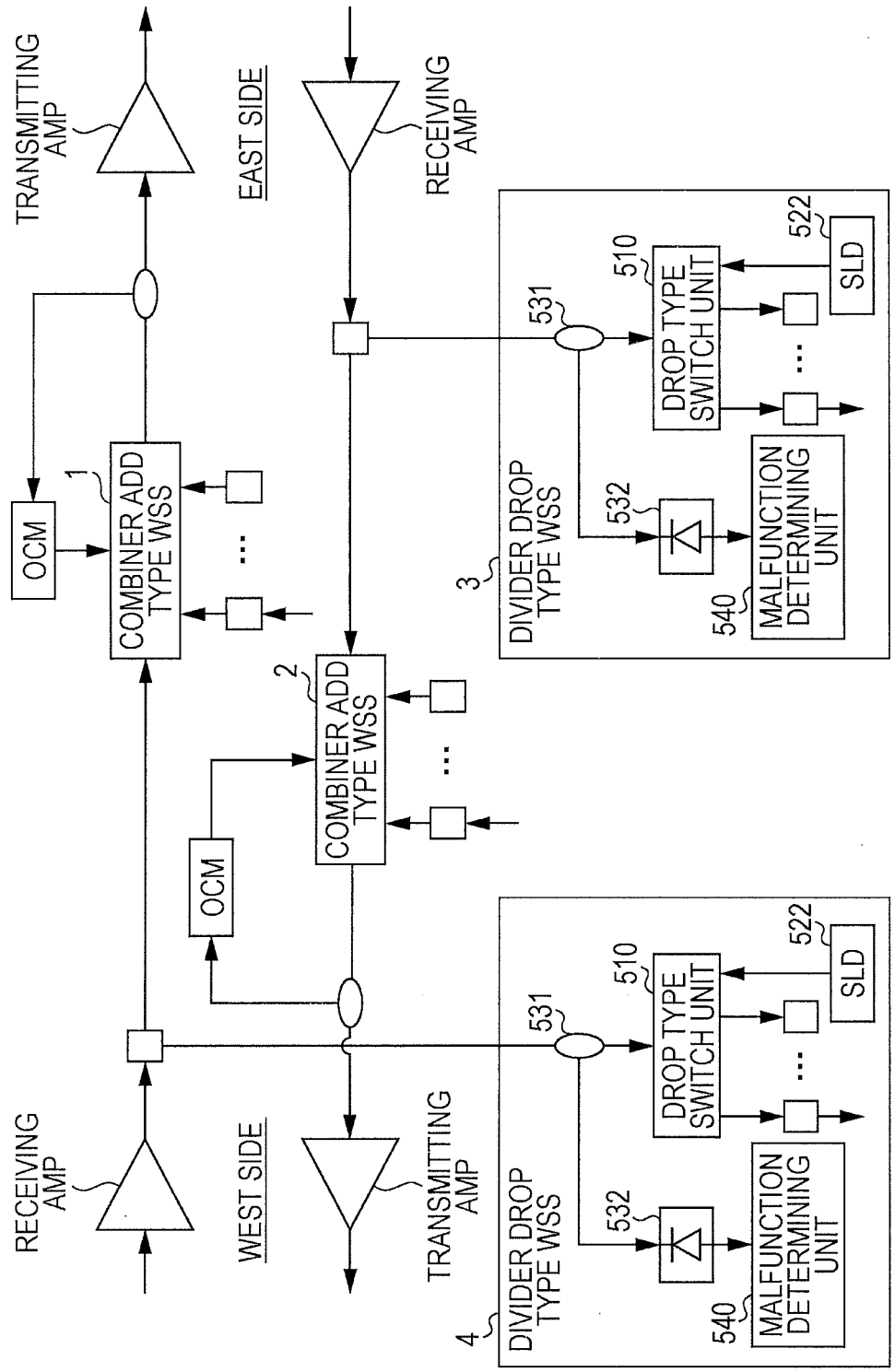
FIG. 39 is a diagram for describing a light transmit device that includes the wavelength selectable switch related to the fifth Embodiment.
Figure 40:
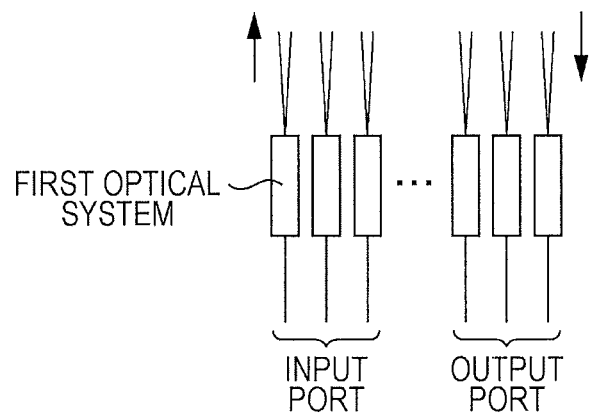
FIG. 40 is a cross-sectional diagram of the wavelength selectable switch according to the related art.
Figure 41:
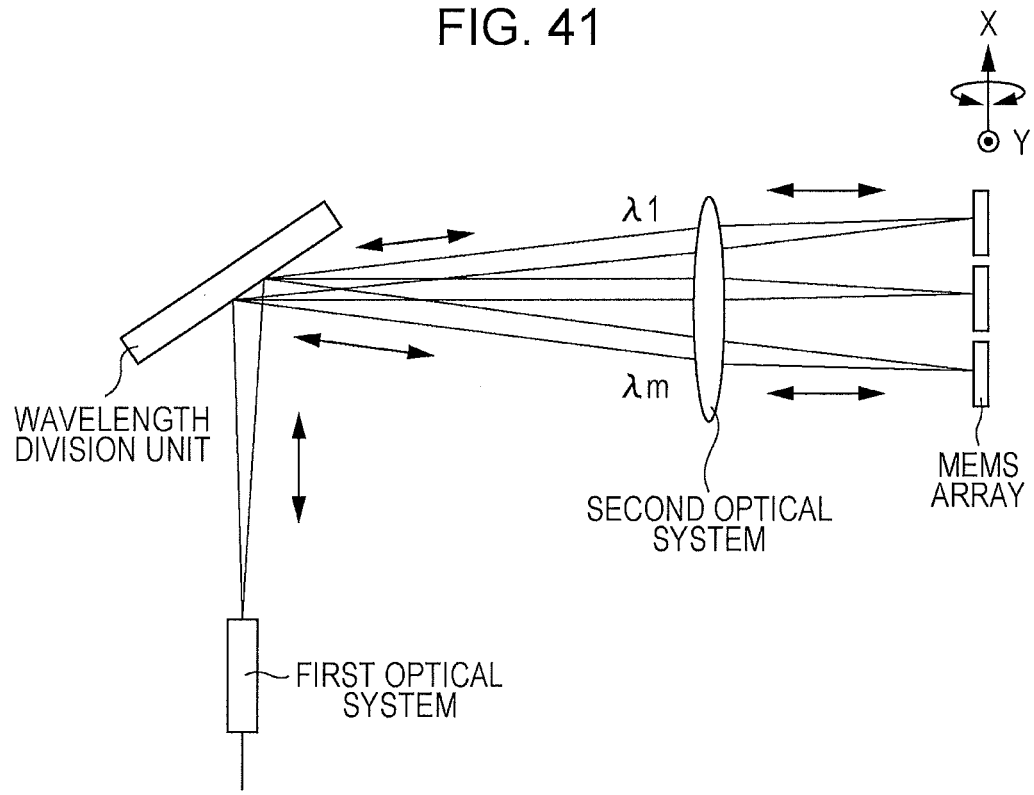
FIG. 41 is a top view diagram of the wavelength selectable switch according to the related art.

FIG. 39 is a diagram for describing a light transmit device that includes the wavelength selectable switch related to the fifth Embodiment. The optical transmission device illustrated in FIG. 39 is, for example, provisioned at a divergence point on a ring type network, and transmits WDM signaling light which includes various information from the east side of the network to the west side, and from the west side to the east side.

The optical transmission device multiplexes multiple signaling light streams using the wavelength selectable switch (WSS), and switches the information to different transmission paths by dividing the signaling light of an arbitrary wavelength from the multiplexed signaling light. As illustrated in FIG. 39, the optical transmission device includes, for example, the combiner ADD type WSS1, the combiner ADD type WSS2, a divider DROP type WSS3, and a divider DROP type WSS4. According to the present embodiment, the wavelength selectable switch 500 related to the fifth Embodiment is built in within the divider DROP type WSS3 and the divider DROP type WSS4.

The combiner ADD type WSS1 and the combiner ADD type WSS2 correspond to the combiner ADD type WSS1 and the combiner ADD type WSS2 illustrated in FIG. 38.

As illustrated in FIG. 39, the divider DROP type WSS3 divides signaling light of a predetermined wavelength transmitted onto a hub network, from the signaling light received by the receiving amp on the east side of the network.

As illustrated in FIG. 39, the divider DROP type WSS4 divides signaling light of a predetermined wavelength transmitted onto a hub network, from the signaling light received by the receiving amp on the west side of the network.

As previously described, the optical transmission device related to the present embodiment switches the information between transfer paths at a divergence point on the network using the divider DROP type WSS3 and the divider DROP type WSS4. The optical transmission device related to the present embodiment provisions the wavelength selectable switch 500 related to the fifth Embodiment within the divider DROP type WSS3 and the divider DROP type WSS4. For this reason, the optical transmission device may differentiate between and determine malfunctions in devices provisioned on the network upstream and downstream from the divider DROP type WSS3 and the divider DROP type WSS4, and malfunctions in the MEMS mirrors in the divider DROP type WSS3 and the divider DROP type WSS4.

Further, according to the present embodiment, an example has been described in which the wavelength selectable switch related to the fifth Embodiment is built in the optical transmission device provisioned at a divergence point on the network, but the wavelength selectable switch related to the sixth Embodiment previously described may also be built in.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical switch comprising:
a switch unit including a light reflection unit of which the reflection direction is changeable, the switch unit including a plurality of input ports and an output port and being configured to optically connect one or more of the input ports to the output port via the light reflection unit by changing the reflection direction of the light reflection unit;
a determining light input unit configured to input, into a first predetermined port, a determining light for determining malfunctions in the light reflection unit;
a light detection unit configured to detect the determining light output from a second predetermined port; and
a malfunction determining unit configured to determine that abnormalities have occurred when the determining light is detected by the light detection unit.

2. An optical switch comprising according to claim 1, wherein the first predetermined port is an unused input port and the second predetermined port is the input port.

3. The optical switch comprising according to claim 1, wherein the first predetermined port is an unused input port, the second predetermined port is the output port, and the malfunction determining unit configured to determine that abnormalities have occurred when the determining light is detected by the light detection unit at a state in which control is performed to change the reflection direction of the light reflection unit.

4. The optical switch according to claim 3,
wherein the determining light input unit inputs into the unused input port, the output port, or the unused output port the determining light which is a modulated light obtained from an intensity modulation on light from a light source using a low frequency signal that has a frequency lower than that of the wavelength division multiplexed signaling light input into the input port;
and wherein the light detection unit detects the modulated light by extracting frequency elements of the a frequency that is the same as the low frequency signal from among the frequency elements of the light output from the output port or the input port;
and wherein the malfunction determining unit determines that an abnormality has occurred in the light reflection unit when the modulated light is detected by the light detection unit.

5. The optical switch according to claim 3,
wherein the determining light input unit inputs into the unused input port, the output port, and the unused output port, the determining light which is light of a wavelength band that is 1/n (n is an integer of 2 or more) as that of the wavelength division signaling light input to the input port;
and wherein the light detection unit includes a wavelength division coupler to set the wavelength band as the division band, and detects the determining light from the output from the wavelength division coupler;
and wherein the malfunction determining unit determines that an abnormality has occurred in the light reflection unit when the determining light is detected by the light detection unit.

6. The optical switch according to claim 3,
wherein the light reflection unit includes a plurality of MEMS mirrors or a plurality of reflection type liquid crystal elements to reflect the signaling light corresponding to each wavelength, in which the signaling light is a plurality of signaling light streams multiplexed into the wavelength division multiplexing signaling light input into the input port;
and wherein the light detection unit detects the determining light per wavelength of the signaling light;
and wherein the malfunction determining unit detects that an abnormality has occurred in the MEMS mirror or the reflection type liquid crystal element corresponding to the wavelength for which the determining light was detected by the light detection unit.

7. The optical switch comprising according to claim 1, wherein the first predetermined port is the output port, the second predetermined port is an unused input port, and the malfunction determining unit configured to determine that abnormalities have occurred when the determining light is detected by the light detection unit at a state in which control is performed to change the reflection direction of the light reflection unit.

8. The optical switch according to claim 1, further comprising a tap coupler configured to divide the determining light output from the second predetermined port into the light detection unit.

9. An optical transmission device comprising:
an optical switch including
a switch unit that includes a light reflection unit of which the reflection direction is changeable, the switch unit including a plurality of input ports and an output port and being configured to optically connect one or more of the input ports to the output port via the light reflection unit by changing the reflection direction of the light reflection unit,
a determining light input unit configured to input into a first predetermined port a determining light for determining malfunctions in the light reflection unit,
a light detection unit configured to detect the determining light from the output from a second predetermined port; and
a malfunction determining unit configured to determine that abnormalities of the light reflection unit have occurred when the determining light is detected by the light detection unit at a state in which control is performed to change the reflection direction of the light reflection unit.

10. The optical transmission devices according to claim 9, wherein the first predetermined port is an unused input port and the second predetermined port is the output port.

11. The optical transmission devices according to claim 9, wherein the first predetermined port is the out port and the second predetermined port is an unused input port.

12. The optical transmission devices according to claim 9, wherein the first predetermined port is an unused output port and the second predetermined port is the input port.

13. An optical switch comprising:
a plurality of input ports including
a first input port to input a signaling light and
a second input port to input a determining light;
an output port;
a reflection unit of which the reflection direction is changeable, configured to receive light from the plurality of input ports and reflect to the output port the light from the at least one of the plurality of input ports;
a light detection unit configured to detect the determining light from the output port;
a control unit configured to cause the reflection of the reflection unit to either adjust to a first reflection direction that connects the first input port to the output port, or to a second reflection direction that connects the second input port to the output port; and
a malfunction determining unit configured to determine that abnormalities of the light reflection unit have occurred when the signaling light input into the second input port is detected by the light detection unit at a state in which the reflection direction of the reflection unit adjusts to the first reflection direction.

* * * * *

UNITED STATES PATENT AND TRADEMARK OFFICE
CERTIFICATE OF CORRECTION

| | |
|---|---|
| PATENT NO. | : 9,071,351 B2 |
| APPLICATION NO. | : 13/834995 |
| DATED | : June 30, 2015 |
| INVENTOR(S) | : Shinji Komiya et al. |

It is certified that error appears in the above-identified patent and that said Letters Patent is hereby corrected as shown below:

In the Claims

Claim 4, Column 35, Line 14

Delete "the a" and insert --a--, therefor.

Signed and Sealed this
Thirteenth Day of October, 2015

Michelle K. Lee
*Director of the United States Patent and Trademark Office*